(12) United States Patent
Ashrafi et al.

(10) Patent No.: US 9,537,575 B2
(45) Date of Patent: Jan. 3, 2017

(54) MODULATION AND MULTIPLE ACCESS TECHNIQUE USING ORBITAL ANGULAR MOMENTUM

(71) Applicant: NXGEN PARTNERS IP, LLC, Dallas, TX (US)

(72) Inventors: Solyman Ashrafi, Plano, TX (US); Roger Linquist, Dallas, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 0 days.

(21) Appl. No.: 14/818,050

(22) Filed: Aug. 4, 2015

(65) Prior Publication Data

US 2016/0044647 A1 Feb. 11, 2016

Related U.S. Application Data

(60) Provisional application No. 62/035,217, filed on Aug. 8, 2014.

(51) Int. Cl.
*H04B 10/516* (2013.01)
*H04J 14/06* (2006.01)
*H04L 27/26* (2006.01)
*H04J 11/00* (2006.01)
*H04W 72/04* (2009.01)

(52) U.S. Cl.
CPC ........... *H04B 10/5161* (2013.01); *H04J 11/00* (2013.01); *H04J 14/06* (2013.01); *H04L 27/2601* (2013.01); *H04W 72/044* (2013.01)

(58) Field of Classification Search
CPC ....... H04L 27/18; H04W 72/044; H04J 11/00; H04J 1/20; H04B 10/5161
See application file for complete search history.

(56) References Cited

U.S. PATENT DOCUMENTS

| 3,459,466 A | 8/1969 | Giordmaine |
| 3,614,722 A | 10/1971 | Jones |
| 4,379,409 A | 4/1983 | Primbsch et al. |

(Continued)

OTHER PUBLICATIONS

Mohammadi, S., Daldorff, L., Bergman, J., Karlsson, R., Thid?, B., Forozesh, K., and Isham, B. Orbital angular momentum in radio—a system study. Antennas and Propagation, IEEE Transactions on, 2010, 58(2), 565-572. [online], [retrieved on Sep. 27, 2015 (Sep. 27, 2015)], Retrieved from the internet:<http://www.researchgate.net/profile/Bo_Thide/publication/224086188_Orbital_Angular_Momentum_in_RadioA_System_Study/links/0912f512e56b9bdcf8000000.pdf>.

(Continued)

*Primary Examiner* — Omer S Mian
(74) *Attorney, Agent, or Firm* — Howison & Arnott, L.L.P.

(57) ABSTRACT

The present invention as disclosed and described herein, in one aspect thereof, comprises a method for multiple access communications over a communications link involves receiving a plurality of data streams from a plurality of data sources. The plurality of data streams are grouped into a plurality of groups. Orthogonal frequency division multiplexing (OFDM) processing is applied to each of the plurality of groups. Each of the plurality of groups uses a same combination of frequency and time slot combinations in the OFDM processing. A different orthogonal function is applied to each of the OFDM processed groups to uniquely identify each of the OFDM processed group from each other and the orthogonal function processed groups are transmitted over the communications link.

10 Claims, 22 Drawing Sheets

(56) References Cited

U.S. PATENT DOCUMENTS

| | | | |
|---|---|---|---|
| 4,503,336 A | 3/1985 | Hutchin et al. | |
| 4,736,463 A | 4/1988 | Chavez | |
| 4,862,115 A | 8/1989 | Lee et al. | |
| 5,051,754 A | 9/1991 | Newberg | |
| 5,220,163 A | 6/1993 | Toughlian et al. | |
| 5,222,071 A | 6/1993 | Pezeshki et al. | |
| 5,272,484 A | 12/1993 | Labaar | |
| 5,543,805 A | 8/1996 | Thaniyavarn | |
| 5,555,530 A | 9/1996 | Meehan | |
| 6,337,659 B1 | 1/2002 | Kim | |
| 6,992,829 B1 | 1/2006 | Jennings et al. | |
| 7,577,165 B1 | 8/2009 | Barrett | |
| 7,729,572 B1 | 6/2010 | Pepper et al. | |
| 7,792,431 B2 | 9/2010 | Jennings et al. | |
| 8,432,884 B1 | 4/2013 | Ashrafi | |
| 8,477,592 B2 | 7/2013 | Sutivong et al. | |
| 8,503,546 B1 | 8/2013 | Ashrafi | |
| 8,559,823 B2 | 10/2013 | Izadpanah et al. | |
| 8,811,366 B2 | 8/2014 | Ashrafi | |
| 9,077,577 B1 | 7/2015 | Ashrafi | |
| 2003/0123877 A1* | 7/2003 | Lo | H04B 10/532 398/34 |
| 2005/0058089 A1 | 3/2005 | Vijayan et al. | |
| 2005/0254826 A1 | 11/2005 | Jennings et al. | |
| 2005/0259914 A1 | 11/2005 | Padgett et al. | |
| 2008/0165883 A1* | 7/2008 | Jiang | H04B 7/0413 375/267 |
| 2008/0260051 A1* | 10/2008 | Boccardi | H04B 7/0452 375/259 |
| 2010/0013696 A1 | 1/2010 | Schmitt et al. | |
| 2011/0255486 A1 | 10/2011 | Luo et al. | |
| 2012/0008587 A1* | 1/2012 | Lee | H04L 1/0041 370/329 |
| 2012/0044979 A1* | 2/2012 | Boasson | H04L 1/0045 375/222 |
| 2012/0207470 A1* | 8/2012 | Djordjevic | H04B 10/25 398/44 |
| 2013/0027774 A1 | 1/2013 | Bovino et al. | |
| 2013/0235744 A1* | 9/2013 | Chen | H04L 47/82 370/252 |
| 2013/0235885 A1 | 9/2013 | Chen et al. | |
| 2014/0355624 A1 | 12/2014 | Li et al. | |
| 2015/0098697 A1 | 4/2015 | Marom et al. | |
| 2015/0146815 A1* | 5/2015 | Berretta | H04L 27/18 375/279 |
| 2015/0245371 A1* | 8/2015 | Jindal | H04W 72/121 370/330 |

OTHER PUBLICATIONS

PCT: International Search Report and Written Opinion of PCT/US2015/43816 (related application), Oct. 29, 2015, 25 pgs.

Solyman Ashrafi, Spurious Resonances and Modelling of Composite Resonators, 37th Annual Symposium on Frequency Control, 1983.

Solyman Ashrafi, Splitting and contrary motion of coherent bremsstrahlung peaks in strained-layer superlattices, Journal of Applied Physics 70:4190-4193, Dec. 1990.

Solyman Ashrafi, Evidence of Chaotic Pattern in Solar Flux Through a Reproducible Sequence of Period-Doubling-Type Bifurcations, Proceedings of Flight Mechanics/Estimation Theory Symposium, National Aeronautics and Space Administration, May 1991.

Solyman Ashrafi, Combining Schatten's Solar Activity Prediction Model with a Chaotic Prediction Model, National Aeronautics and Space Administration, Nov. 1991.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Detecting and Disentangling Nonlinear Structure from Solar Flux Time Series, 43rd Congress of the International Astronautical Federation, Aug. 1992.

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

Solyman Ashrafi, Channeling Radiation of Electrons in Crystal Lattices, Essays on Classical and Quantum Dynamics, Gordon and Breach Science Publishers, 1991.

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple Orbital-Angular-Momentum Beams, Globecom2014 OWC Workshop, 2014.

Solyman Ashrafi, Optical Communications Using Orbital Angular Momentum Beams, Adv. Opt. Photon. 7, 66-106, Advances in Optics and Photonic, 2015.

Solyman Ashrafi, Performance Enhancement of an Orbital-Angular-Momentum-Based Free-Space Optical Communication Link through Beam Divergence Controlling, OSA Technical Digest (online), paper M2F.6. The Optical Society, 2015.

Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Performance Metrics and Design Considerations for a Free-Space Optical Orbital-Angular-Momentum-Multiplexed Communication Link, The Optical Society, vol. 2, No. 4, Apr. 2015.

Solyman Ashrafi, Demonstration of Distance Emulation for an Orbital-Angular-Momentum Beam. OSA Technical Digest (online), paper STh1F.6. The Optical Society, 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.

Solyman Ashrafi, Experimental Measurements of Multipath-Induced Intra- and Inter-Channel Crosstalk Effects in a Millimeter-Wave Communications Link using Orbital-Angular-Momentum Multiplexing, ICC 2015, London, UK, 2014.

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

Solyman Ashrafi, 400-Gbit/s Free-Space Optical Communications Link Over 120-meter Using Multiplexing of 4 Collocated Orbital-

(56) References Cited

OTHER PUBLICATIONS

Angular-Momentum Beams. OSA Technical Digest (online), paper M2F.1. The Optical Society, 2015.

Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.

Wang et al: "Terabit free-space data transmission employing orbital angular momentum multiplexing", Nature Photonics, vol. 6, Jul. 2012, pp. 488-496.

Solyman Ashrafi, An Information Theoretic Framework to Increase Spectral Efficiency, IEEE Transactions on Information Theory, vol. XX, No. Y, Oct. 2014, Dallas, Texas.

H. Yao et al, Patch Antenna Array for the Generation of Millimeter-wave Hermite-Gaussian Beams, IEEE Antennas and Wireless Propagation Letters, (pending publication).

Yongxiong Ren et al, Experimental Investigation of Data Transmission Over a Graded-index Multimode Fiber Using the Basis of Orbital Angular Momentum Modes (pending publication).

M. Nouri et al., Perturbations of Laguerre-Gaussian Beams by Chiral Molecules (pending publication).

Solyman Ashrafi, Acoustically induced stresses in elastic cylinders and their visualization, The Journal of the Acoustical Society of America 82(4):1378-1385, Sep. 1987.

Solyman Ashrafi, Splitting of channeling-radiation peaks in strained-layer superlattices, Journal of the Optical Society of America B 8(12), Nov. 1991.

\* cited by examiner

MODULATION AND MULTIPLE ACCESS TECHNIQUE USING ORBITAL ANGULAR MOMENTUM

CROSS-REFERENCE TO RELATED APPLICATIONS

This application claims benefit of U.S. Provisional Application No. 62/035,217, filed Aug. 8, 2014, entitled NEW MODULATION AND MULTIPLE ACCESS TECHNIQUE USING ORBITAL ANGULAR MOMENTUM, the specification of which is incorporated herein by reference in its entirety.

TECHNICAL FIELD

The present invention relates to multiple axis processing techniques, and more particularly to utilizing orbital angular momentum processing in parallel with orthogonal frequency division multiplexing in order to increase channel bandwidth within a data transmission system.

BACKGROUND

The use of voice and data networks has greatly increased as the number of personal computing and communication devices, such as laptop computers, mobile telephones, Smartphones, tablets, et cetera, has grown. The astronomically increasing number of personal mobile communication devices has concurrently increased the amount of data being transmitted over the networks providing infrastructure for these mobile communication devices. As these mobile communication devices become more ubiquitous in business and personal lifestyles, the abilities of these networks to support all of the new users and user devices has been strained. Thus, a major concern of network infrastructure providers is the ability to increase their bandwidth in order to support the greater load of voice and data communications and particularly video that are occurring. Traditional manners for increasing the bandwidth in such systems have involved increasing the number of channels so that a greater number of communications may be transmitted, or increasing the speed at which information is transmitted over existing channels in order to provide greater throughput levels over the existing channel resources.

However, while each of these techniques have improved system bandwidths, existing technologies have taken the speed of communications to a level such that drastic additional speed increases are not possible, even though bandwidth requirements due to increased usage are continuing to grow exponentially. Additionally, the number of channels assigned for voice and data communications, while increasing somewhat, have not increased to a level to completely support the increasing demands of a voice and data intensive use society. Thus, there is a great need for some manner for increasing the bandwidth throughput within existing voice and data communication that increases the bandwidth on existing voice and data channels.

Another issue arising in communication systems is limited channel bandwidth providing only a set number of communication channels which may be established between a transmitting and receiving unit. The increased use of voice and data communications has created an increased need for greater channel availability in order to provide connections for a growing number of customers.

SUMMARY

A method for multiple access communications over a communications link involves receiving a plurality of data streams from a plurality of data sources. The plurality of data streams are grouped into a plurality of groups. Orthogonal frequency division multiplexing (OFDM) processing is applied to each of the plurality of groups. Each of the plurality of groups uses a same combination of frequency and time slot combinations in the OFDM processing. A different orthogonal function is applied to each of the OFDM processed groups to uniquely identify each of the OFDM processed group from each other and the orthogonal function processed groups are transmitted over the communications link.

BRIEF DESCRIPTION OF THE DRAWINGS

For a more complete understanding, reference is now made to the following description taken in conjunction with the accompanying Drawings in which.

DETAILED DESCRIPTION

Figure 1:
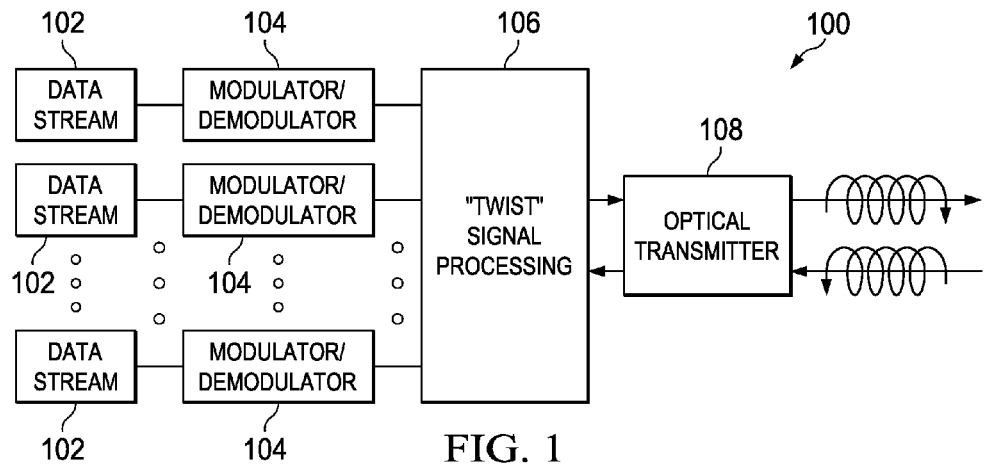
FIG. 1 is a functional block diagram of a system for generating orbital angular momentum within a communication system.

Referring now to the drawings, wherein like reference numbers are used herein to designate like elements throughout, the various views and embodiments of new modulation and multiple access technique using orbital angular momentum are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 3:
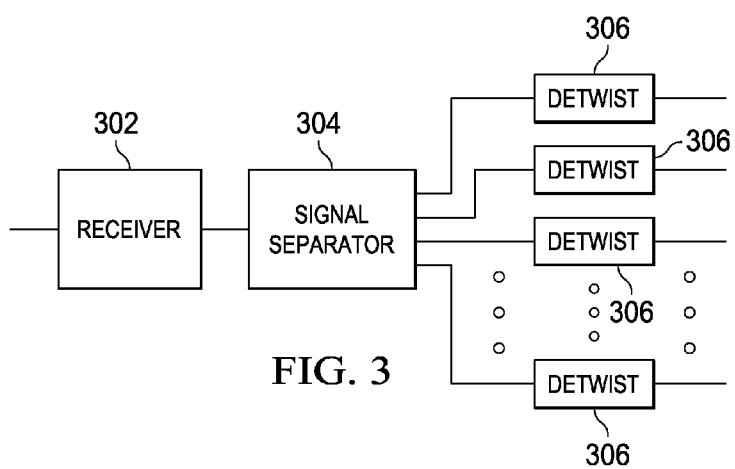
FIG. 3 is a functional block diagram illustrating the manner for removing orbital angular momentum from a received signal including a plurality of data streams.

Referring now more particularly to FIG. 1, there is illustrated a functional block diagram of a system for generating the orbital angular momentum "twist" within a communication system, such as that illustrated with respect to FIG. 3, to provide a data stream that may be combined with multiple other data streams for transmission upon a same wavelength or frequency. Multiple data streams 102 are provided to the transmission processing circuitry 100. Each of the data streams 102 comprises, for example, an end to end connection carrying a voice call or a packet connection transmitting non-circuit switch packed data over a data connection. The multiple data streams 102 are processed by modulator/demodulator circuitry 104. The modulator/demodulator circuitry 104 modulates the received data stream 102 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 106. Each of the modulated data streams from the modulator/demodulator 104 are provided a different orbital angular momentum by the orbital angular momentum electromagnetic block 106 such that each of the modulated data streams have a unique and different orbital angular momentum associated therewith. Each of the modulated signals having an associated orbital angular momentum are provided to an optical transmitter 108 that transmits each of the modulated data streams having a unique orbital angular momentum on a same wavelength. Each wavelength has a selected number of bandwidth slots B and may have its data transmission capability increase by a factor of the number of degrees of orbital angular momentum l that are provided from the OAM electromagnetic block 106. The optical transmitter 108 transmitting signals at a single wavelength could transmit B groups of information. The optical transmitter 108 and OAM electromagnetic block 106 may transmit l×B groups of information according to the configuration described herein.

In a receiving mode, the optical transmitter 108 will have a wavelength including multiple signals transmitted therein having different orbital angular momentum signals embedded therein. The optical transmitter 108 forwards these signals to the OAM signal processing block 106, which separates each of the signals having different orbital angular momentum and provides the separated signals to the demodulator circuitry 104. The demodulation process extracts the data streams 102 from the modulated signals and provides it at the receiving end using the multiple layer overlay demodulation technique.

Figure 2:
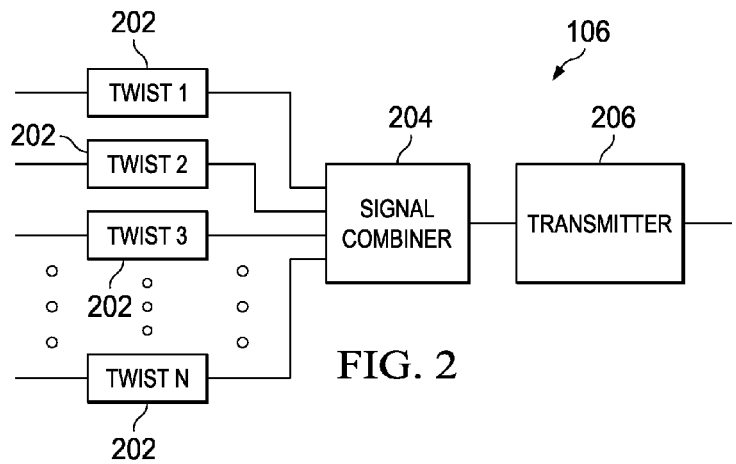
FIG. 2 is a functional block diagram of the orbital angular momentum signal processing block of FIG. 1.

Referring now to FIG. 2, there is provided a more detailed functional description of the OAM signal processing block 106. Each of the input data streams are provided to OAM circuitry 202. Each of the OAM circuitry 202 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 202 are unique to the data stream that is provided thereto. An infinite number of orbital angular momentums may be applied to different input data streams using many different currents. Each of the separately generated data streams are provided to a signal combiner 204, which combines the signals onto a wavelength for transmission from the transmitter 206.

Referring now to FIG. 3, there is illustrated an embodiment in which the OAM processing circuitry 106 may separate a received signal into multiple data streams. The receiver 302 receives the combined OAM signals on a single wavelength and provides this information to a signal separator 304. The signal separator 304 separates each of the signals having different orbital angular momentums from the received wavelength and provides the separated signals to OAM de-twisting circuitry 306. The OAM de-twisting circuitry 306 removes the associated OAM twist from each of the associated signals and provides the received modulated data stream for further processing. The signal separator 304 separates each of the received signals that have had the orbital angular momentum removed therefrom into individual received signals. The individually received signals are provided to the receiver 302 for demodulation using, for example, multiple level overlay demodulation as will be more fully described herein below.

Figure 4:
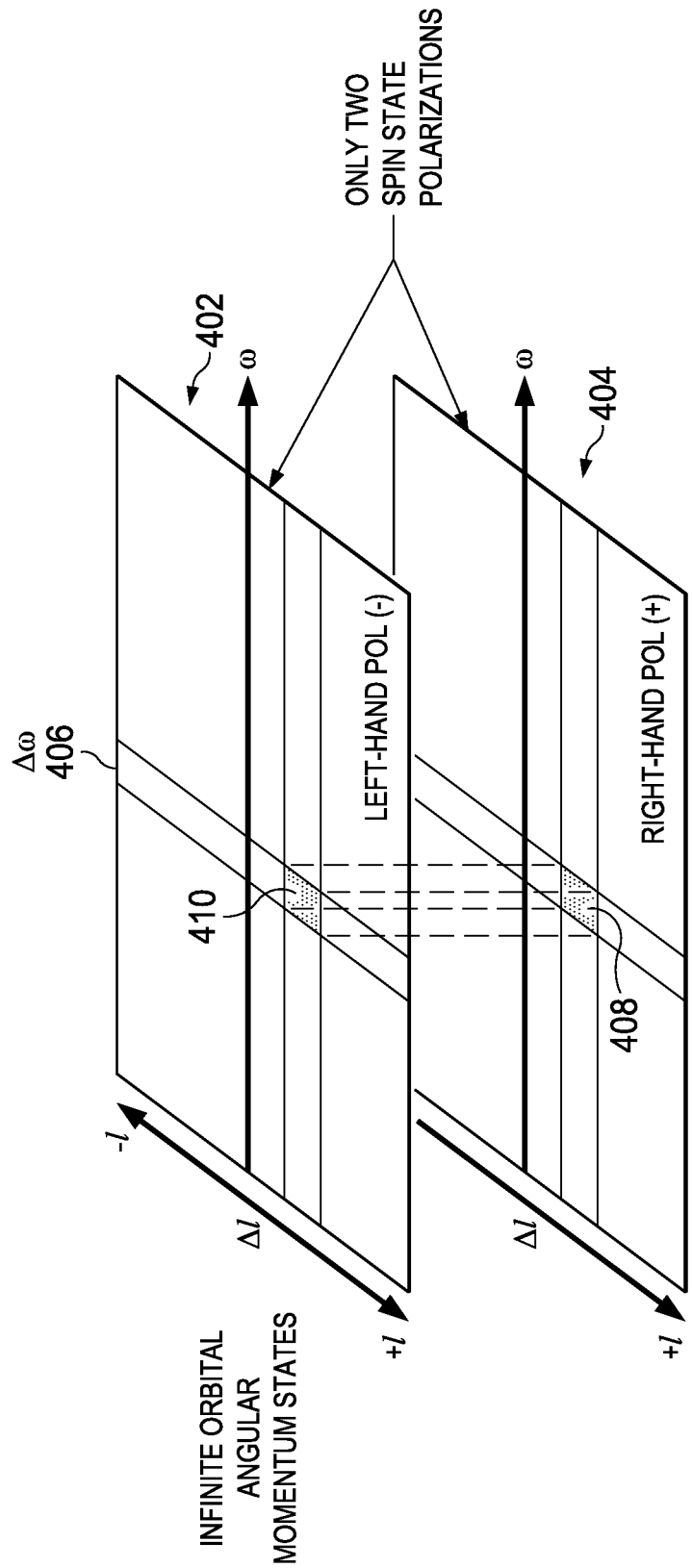
FIG. 4 illustrates a single wavelength having two quanti-spin polarizations providing an infinite number of signals having various orbital angular momentums associated therewith.

FIG. 4 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 402 represents the potentially available signals for a left handed signal polarization, while the bottom grid 404 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 406 in both the left handed polarization plane 402 and the right handed polarization plane 404 can provide an infinite number of signals at different orbital angular momentum states Δl. Blocks 408 and 410 represent a particular signal having an orbital angular momentum Δl at a frequency Δω or wavelength in both the right handed polarization plane 404 and left handed polarization plane 410, respectively. By changing to a different orbital angular momentum within the same frequency Δω or wavelength 406, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 4, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Figure 5A:
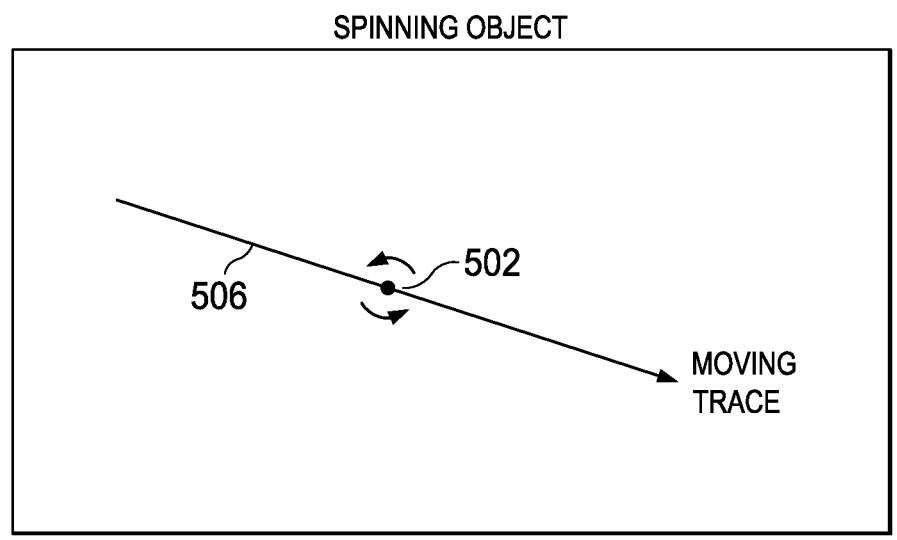
FIG. 5A illustrates an object with only a spin angular momentum.
Figure 5B:
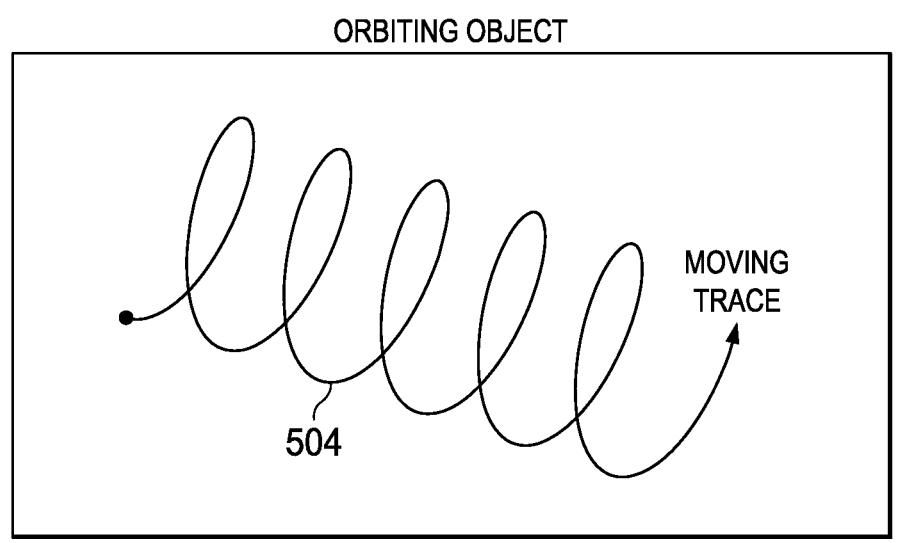
FIG. 5B illustrates an object with an orbital angular momentum.
Figure 5C:
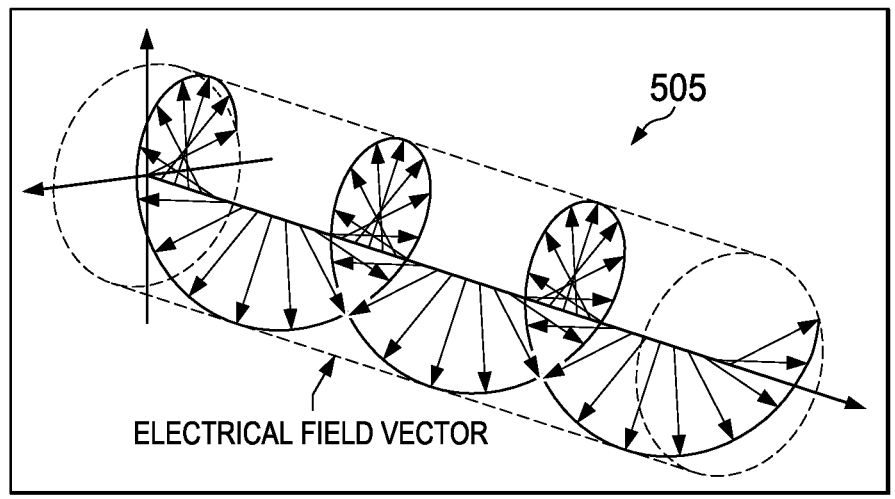
FIG. 5C illustrates a circularly polarized beam carrying spin angular momentum.
Figure 5D:
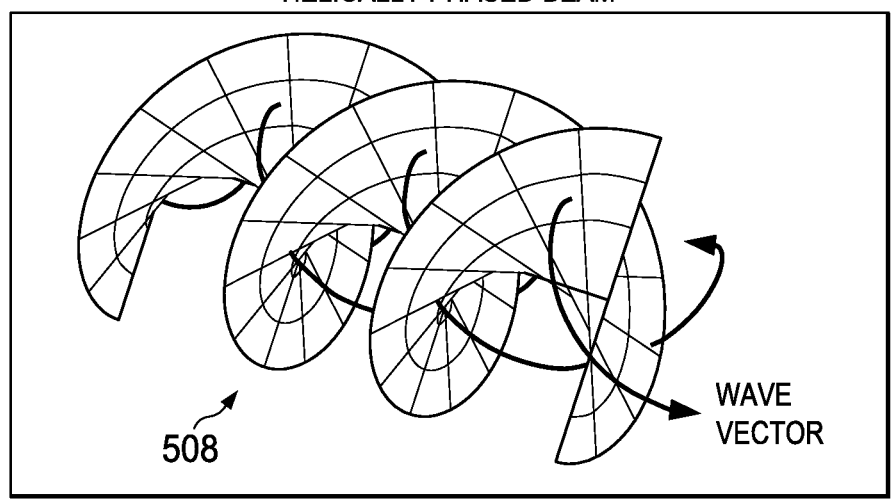
FIG. 5D illustrates the phase structure of a light beam carrying an orbital angular momentum.

It is well-known that the concept of linear momentum is usually associated with objects moving in a straight line. The object could also carry angular momentum if it has a rotational motion, such as spinning (i.e., spin angular momentum (SAM) 502), or orbiting around an axis 506 (i.e., OAM 504), as shown in FIGS. 5A and 5B, respectively. A light beam may also have rotational motion as it propagates. In paraxial approximation, a light beam carries SAM 502 if the electrical field rotates along the beam axis 506 (i.e., circularly polarized light 505), and carries OAM 504 if the wave vector spirals around the beam axis 506, leading to a helical phase front 508, as shown in FIGS. 5C and 5D. In its analytical expression, this helical phase front 508 is usually related to a phase term of exp(ilθ) in the transverse plane, where θ refers to the angular coordinate, and l is an integer indicating the number of intertwined helices (i.e., the number of 2π phase shifts along the circle around the beam axis). l could be a positive, negative integer or zero, corresponding to clockwise, counterclockwise phase helices or a Gaussian beam with no helix, respectively.

Two important concepts relating to OAM include:

1) OAM and polarization: As mentioned above, an OAM beam is manifested as a beam with a helical phase front and therefore a twisting wavevector, while polarization states can only be connected to SAM 502. A light beam carries SAM 502 of ±h/2π (h is Plank's constant) per photon if it is left or right circularly polarized, and carries no SAM 502 if it is linearly polarized. Although the SAM 502 and OAM 504 of light can be coupled to each other under certain scenarios, they can be clearly distinguished for a paraxial light beam. Therefore, with the paraxial assumption, OAM 504 and polarization can be considered as two independent properties of light.

2) OAM beam and Laguerre-Gaussian (LG) beam: In general, an OAM-carrying beam could refer to any helically phased light beam, irrespective of its radial distribution (although sometimes OAM could also be carried by a non-helically phased beam). LG beam is a special subset among all OAM-carrying beams, due to that the analytical expression of LG beams are eigen-solutions of paraxial form of the wave equation in a cylindrical coordinates. For an LG beam, both azimuthal and radial wavefront distributions are well defined, and are indicated by two index numbers, l and p, of which l has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same l index but a different p index) due to the absence of radial definition. The term of "OAM beam" refers to all helically phased beams, and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0} \quad (2)$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2|B|^2) \text{ Hamiltonian (total energy)}$$

$$\frac{dU^{mech}}{dt} + \frac{dU^{em}}{dt} + \oint_{s'} d^2 x' \hat{n}' \cdot S = 0 \text{ conservation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B) \text{ linear momentum}$$

$$\frac{dp^{mech}}{dt} + \frac{dp^{em}}{dt} + \oint_{s'} d^2 x' \hat{n}' \cdot T = 0 \text{ conservation of linear momentum}$$

The conservation of system center of energy is represented by the equation:

$$R = \frac{1}{H}\sum_i (x_i - x_0)m_i\gamma_i c^2 + \frac{\varepsilon_0}{2H}\int d^3x(x-x_0)(|E^2| + c^2|B^2|) \quad (3)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{S'} d^2x'\hat{n}' \cdot M = 0 \text{ conservation of angular momentum}$$

For radiation beams in free space, the EM field angular momentum $J^{em}$ can be separated into two parts:

$$J^{em} = \varepsilon_0 \int_V d^3x'(E \times A) + \varepsilon_0 \int_V d^3x' E_i[(x'-x_0)\times \nabla]A_i$$

For each singular Fourier mode in real valued representation:

$$J^{em} = -i\frac{\varepsilon_0}{2\omega}\int_{V'} d^3x'(E^* \times E) - i\frac{\varepsilon_0}{2\omega}\int_{V'} d^3x' E_i[(x'-x_0)\times \nabla]E_i \quad (5)$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em}=L^{em}+S^{em}$ are radiated all the way to the far field.

By using Poynting theorem, the optical vorticity of the signals may be determined according to the optical velocity equation:

$$\frac{\partial U}{\partial t} + \nabla \cdot S = 0, \quad \text{continuity equation}$$

where S is the Poynting vector $$S = \frac{1}{4}(E \times H^* + E^* \times H), \quad (6)$$

and U is the energy density $$U = \frac{1}{4}(\varepsilon|E|^2 + \mu_0|H|^2), \quad (7)$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left(\frac{E \times H^* + E^* \times H}{\varepsilon|E|^2 + \mu_0|H|^2}\right) \quad (8)$$

Figure 6A:
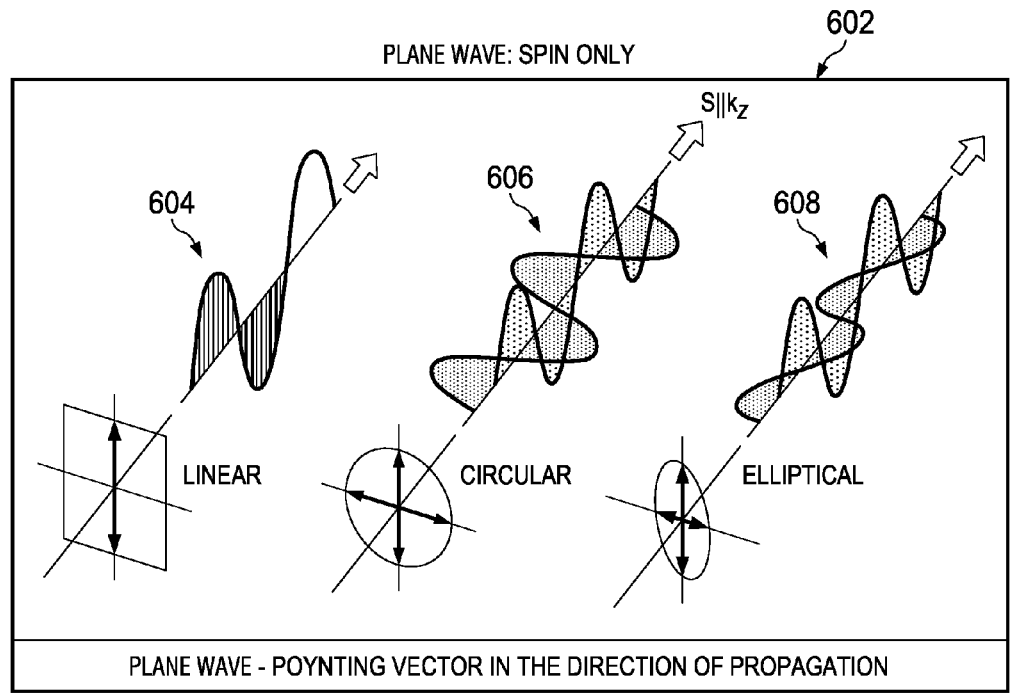
FIG. 6A illustrates a plane wave having only variations in the spin angular momentum.
Figure 6B:
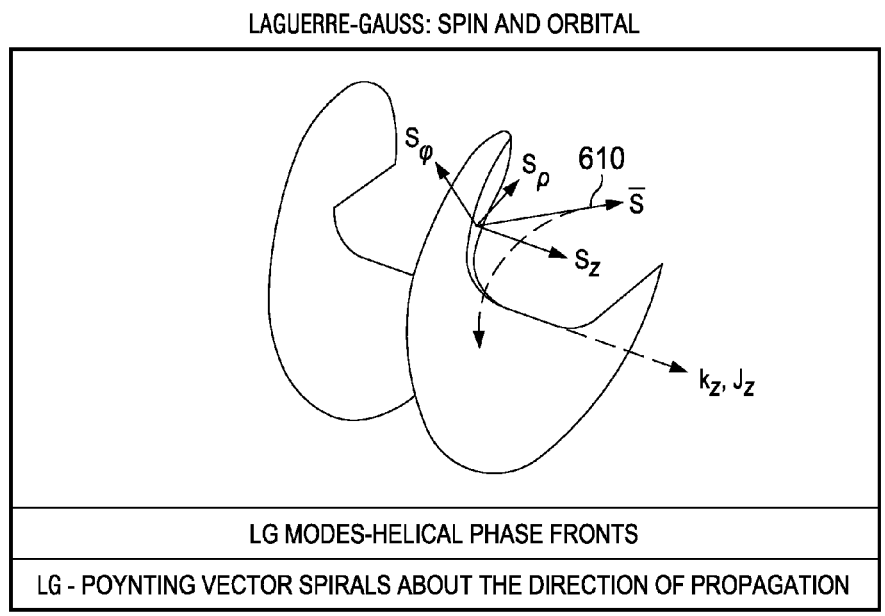
FIG. 6B illustrates a signal having both spin and orbital angular momentum applied thereto.

Referring now to FIGS. 6A and 6B, there is illustrated the manner in which a signal and its associated Poynting vector in a plane wave situation. In the plane wave situation illustrated generally at 602, the transmitted signal may take one of three configurations. When the electric field vectors are in the same direction, a linear signal is provided, as illustrated generally at 604. Within a circular polarization 606, the electric field vectors rotate with the same magnitude. Within the elliptical polarization 608, the electric field vectors rotate but have differing magnitudes. The Poynting vector remains in a constant direction for the signal configuration to FIG. 6A and always perpendicular to the electric and magnetic fields. Referring now to FIG. 6B, when a unique orbital angular momentum is applied to a signal as described here and above, the Poynting vector S 610 will spiral about the direction of propagation of the signal. This spiral may be varied in order to enable signals to be transmitted on the same frequency as described herein.

Figure 7A:
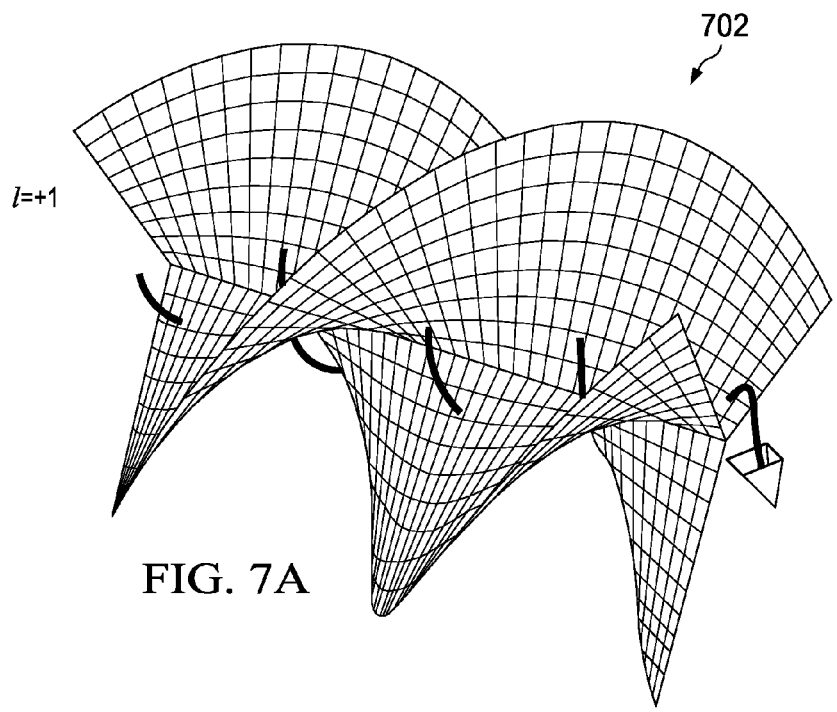
FIGS. 7A-7C illustrate various signals having different orbital angular momentum applied thereto.
Figure 7B:
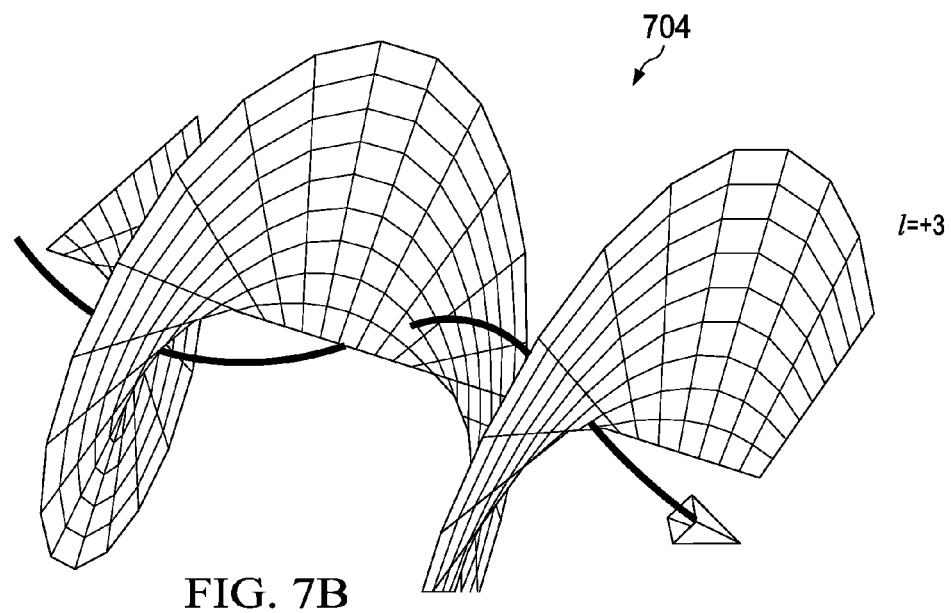
Figure 7C:
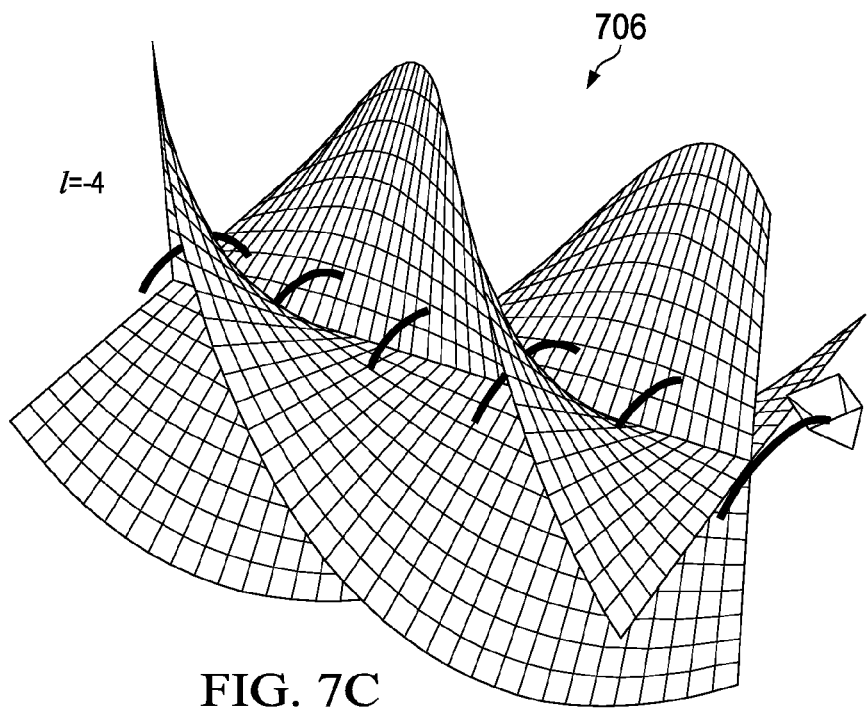

FIGS. 7A-7C illustrate the differences in signals having different helicity (i.e., orbital angular momentums). Each of the spiraling Poynting vectors associated with the signals 602, 604, and 606 provide a different shaped signal. Signal 702 has an orbital angular momentum of +1, signal 704 has an orbital angular momentum of +3, and signal 706 has an orbital angular momentum of −4. Each signal has a distinct angular momentum and associated Poynting vector enabling the signal to be distinguished from other signals within a same frequency. This allows differing type of information to be combined on the same frequency, since these signals are separately detectable and do not interfere with each other (Eigen channels).

Figure 7D:
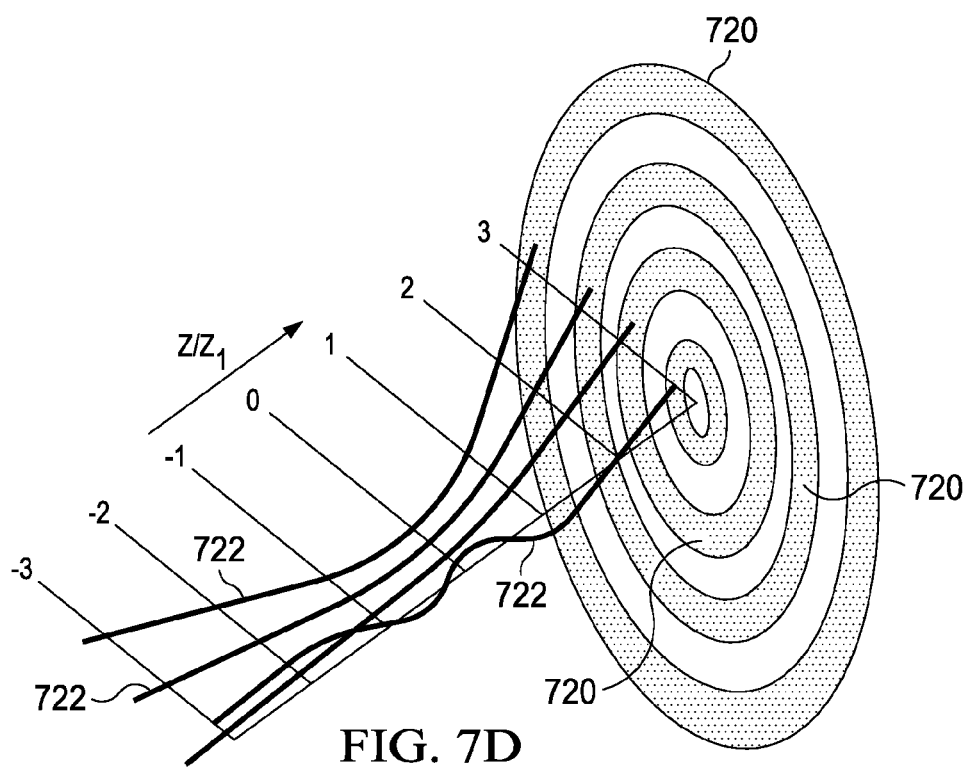
FIG. 7D illustrates a propagation of Poynting vectors for various Eigen modes.
Figure 7E:
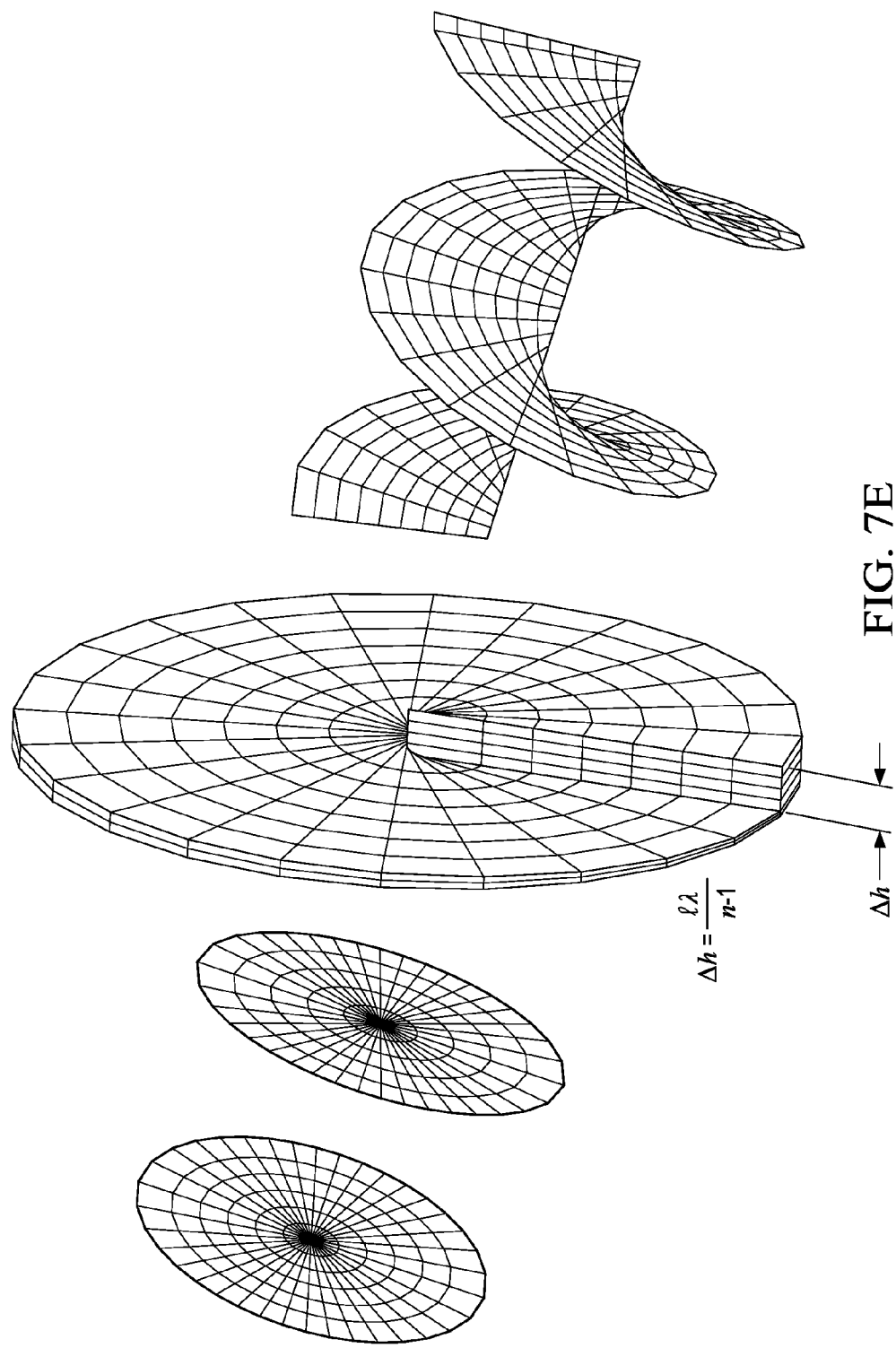
FIG. 7E illustrates a spiral phase plate.

FIG. 7D illustrates the propagation of Poynting vectors for various Eigen modes. Each of the rings 720 represents a different Eigen mode or twist representing a different orbital angular momentum within the same frequency. Each of these rings 720 represents a different orthogonal channel. Each of the Eigen modes has a Poynting vector 722 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "l" or the amount of twist or OAM applied to the signal. The helicity index may be positive or negative. In RF, different topological charges can be created and muxed together and de-muxed to separate the topological charges.

The topological charges 1 s can be created using Spiral Phase Plates (SPPs) as shown in FIG. 6E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

These embodiments can create cross talk and multipath interference. However, cross talk and multipath interference can be corrected using RF Multiple-Input-Multiple-Output (MIMO). In one embodiment, most of the channel impairments can be detected using a control or pilot channel and be corrected using algorithmic techniques (closed loop control system). However, other techniques can be used to eliminate these channel impairments.

Cross talk and multipath interference can be corrected using RF Multiple-Input-Multiple-Output (MIMO). Most of the channel impairments can be detected using a control or pilot channel and be corrected using algorithmic techniques (closed loop control system).

While the application of orbital angular momentum to various signals allow the signals to be orthogonal to each other and used on a same signal carrying medium, other orthogonal function/signals can be applied to data streams to create the orthogonal signals on the same signal media carrier.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form;

$$\Delta t \, \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms. These types of orthogonal signals that reduce the time bandwidth product and thereby increase the spectral efficiency of the channel.

Hermite-Gaussian polynomials are one example of a classical orthogonal polynomial sequence, which are the Eigenstates of a quantum harmonic oscillator. Signals based on Hermite-Gaussian polynomials possess the minimal time-bandwidth product property described above, and may be used for embodiments of MLO systems. However, it should be understood that other signals may also be used, for example orthogonal polynomials such as Jacobi polynomials Gegenbauer polynomials, Legendre polynomials, Chebyshev polynomials, and Laguerre-Gaussian polynomials. Q-functions are another class of functions that can be employed as a basis for MLO signals.

In addition to the time bandwidth minimization described above, the plurality of data streams can be processed to provide minimization of the Space-Momentum products in spatial modulation. In this case:

$$\Delta x \Delta p = \tfrac{1}{2}$$

Processing of the data streams in this manner create wavefronts that are spatial. The above described scheme is applicable to twisted pair, coaxial cable, fiber optic, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Multiple Access Techniques Using Orbital Angular Momentum

Multiple access techniques improve the overall spectral efficiency of an orthogonal frequency division multiplexing (OFDM) system at the physical layer. OFDM is used within Wi-Fi, WiMAX and LTE systems. Electromagnetic waves carry a spin angular momentum (a quantum feature) that is manifested to polarization states (a classic feature). However, electromagnetic waves can carry an orbital angular momentum (a quantum feature) or other orthogonal states that is manifested to helicity and phase structure (a classic feature). This orbital angular momentum is independent of the polarization state and therefore independent of spin. Within a La-Guerre Gaussian mode having an azimuthal phase term, orbital angular momentum eigentstates can carry an orbital angular momentum value.

Photon polarization provides a useful physical realization of a qubit and is employed in demonstrations of quantum key distribution. However, measurements of the polarization only provide one bit of information by a photon. However, waves carrying orbital angular momentum (OAM) can potentially have many helicities or other orthogonal states and are therefore not limited to only two states of a positive or negative spin.

Figure 8:
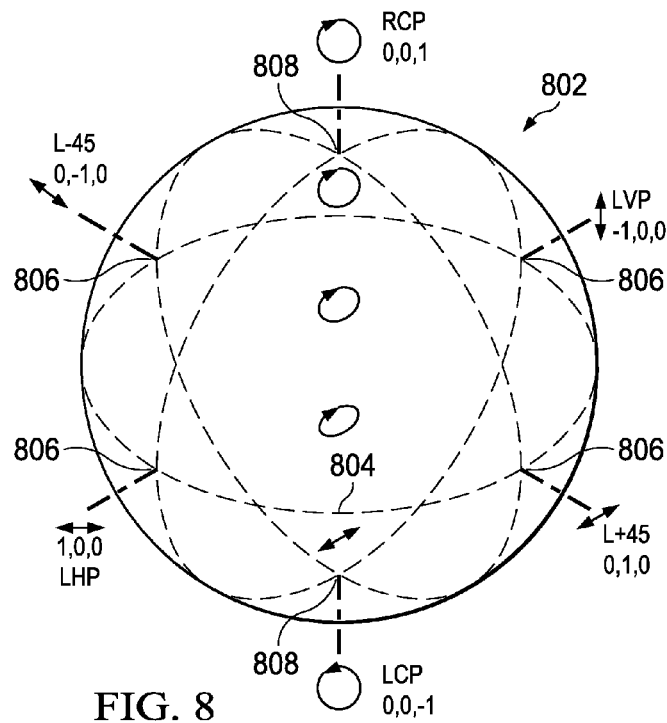
FIG. 8 illustrates an example of a Poincare sphere.

The polarization states can be completely characterized in terms of the Stokes parameter or visualized on a Poincare sphere. A Stokes parameter is a value describing the polarization state of a wave. Consequently, the Stokes parameters are the Cartesian coordinates of a space in which any completely polarized beam is represented by a point on a Poincare sphere with a unit radius around the origin. An example of a Poincare sphere is illustrated in FIG. 8. Within a Poincare sphere 802, any state of polarization can be uniquely represented by a point on or within the unit sphere 802 centered on a rectangular coordinate system. The coordinates of the point are the three normalized Stokes parameters describing the state of polarization. The degree of polarization corresponds to a point that is a distance of that point from the coordinate origin, and can vary from zero at the origin (unpolarized) to unity at the surface of the sphere (completely polarized). Linear polarizations are located at the equator 804. Examples of this are shown at points 806. Circular polarizations are located at the pole of the Poincare sphere 802 at points 808. Intermediate elliptical polarizations are continuously distributed at locations between the equators 804 and the pole 808.

Because a state of polarization is represented by a point, a continuous evolution of polarization can be represented as a continuous path on the Poincare sphere 802. For example, the evolution of polarization for light traveling through a waveplate or birefringent crystal can be represented by a circular arc about an axis drawn through two points representing the eigenmodes at the medium. Eigenmodes are polarizations that propagate unchanged through the medium. The real, three-dimensional space of the Poincare surface is closely linked to the complex two-dimensional space of Jones vectors. Most physical ideas can be expressed in either context and mathematically linked to angular momentums.

Figure 9A:
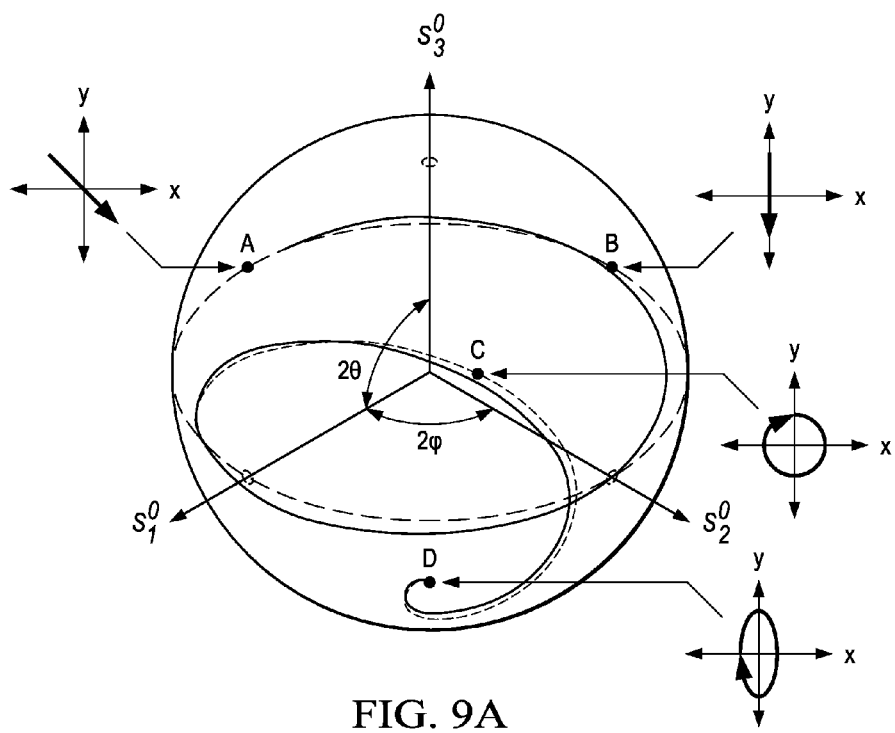
FIGS. 9A-9C illustrate examples of simple trajectories on Poincare spheres that can be implemented as a modulation process.
Figure 9B:
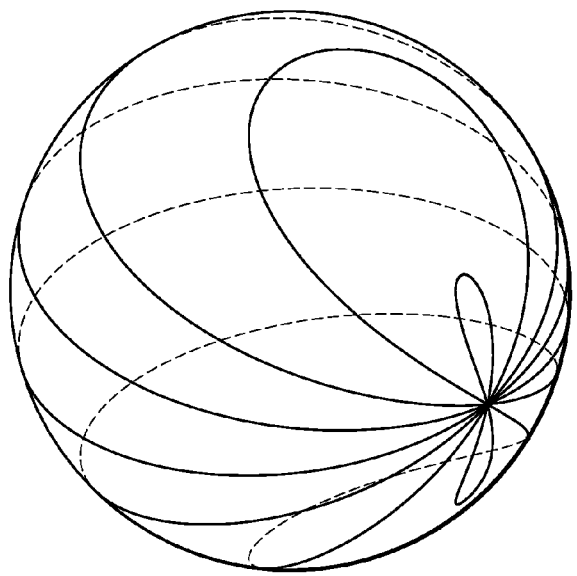
Figure 9C:
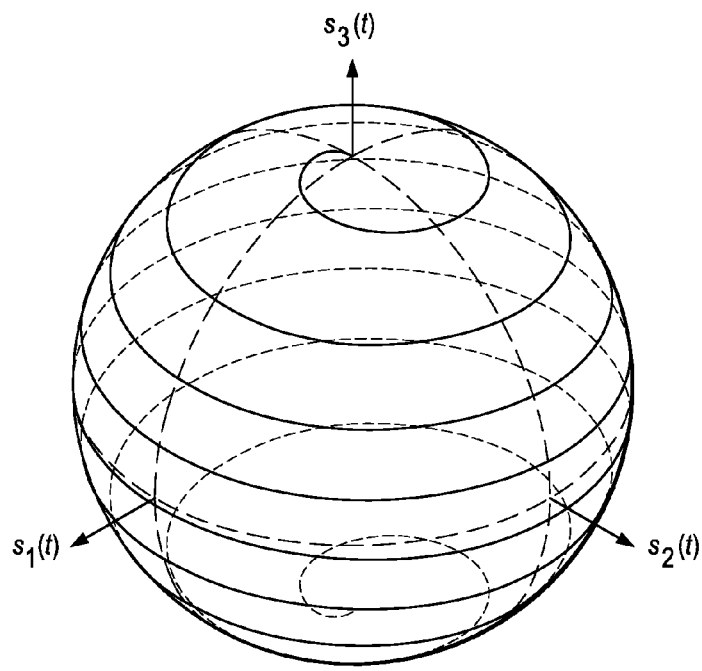

A new modulation scheme using orbital angular momentum or other orthogonal states of the waves are used as a degree of freedom to perform modulation. The modulation can be traced as a trajectory on the surface of a Poincare sphere. If this path is known only between a transmitter and a receiver, this can be a method for both secure communication as well as modulation techniques using polarization as opposed to amplitude, frequency or phase. The transmitter would use the modulation represented by the trajectory on the Poincare sphere to modulate and transmit data while the receiver would use the trajectory to demodulate data at the receiver. Referring now to FIGS. 9A-9C, there are provided some examples of simple trajectories that can be implemented as a modulation process. However, any complicated path can be implemented on the surface of the eigensphere.

As referenced previously, the polarization states of a monochromatic light beam can be characterized by Stokes parameters as follows:

$$P_1 = \frac{I_{0°} - I_{90°}}{I_{0°} + I_{90°}}$$

$$P_2 = \frac{I_{45°} - I_{135°}}{I_{45°} + I_{135°}}$$

$$P_3 = \frac{I_R - I_L}{I_R + I_L}$$

I is the intensities recorded through various orientations of linear polarizer's and $I_R$ and $I_L$ are the intensities of the circularly polarized components in the beam. The polarization states may be added together such that $P_1^2+P_2^2+P_3^2=1$. This means that the polarized beam can be represented by a point on a sphere with a unit radius, i.e. a Poincare sphere. Any point on the Poincare sphere can be described as a superposition of left and right-handed circular polarizations. Thus, a linearly polarized beam is a superposition of equal intensities of $I_R$ and $I_L$.

An analogous sphere can be constructed for superposition of left and right-handed Laguerre Gaussian modes with azimuthal phase term $e^{\pm il\phi}$ which are OAM Eigen states $(LG_0^{+l}, LG_0^{-l})$ and have orbital angular momentum of +1½ and −1½ per photon.

Therefore, in an analogous manner to Stoke's parameters, a set of parameters with respect to Hermite Gaussian modes may be represented as:

$$0_1 = \frac{I_{HG_{1,0}^{0°}} - I_{HG_{1,0}^{90°}}}{I_{HG_{1,0}^{0°}} + I_{HG_{1,0}^{90°}}}$$

$$0_2 = \frac{I_{HG_{1,0}^{45°}} - I_{HG_{1,0}^{135°}}}{I_{HG_{1,0}^{45°}} + I_{HG_{1,0}^{135°}}}$$

$$0_3 = \frac{I_{LG_0^1} - I_{LG_0^{-1}}}{I_{LG_0^1} + I_{LG_0^{-1}}}$$

$$0_1^2 + 0_2^2 + 0_3^2 = 1$$

Figure 22A:
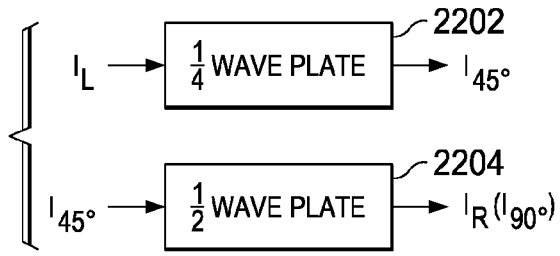
FIG. 22A illustrates a quarterwave plate.
Figure 22B:
FIG. 22B illustrates a halfwave plate.
Figure 22C:
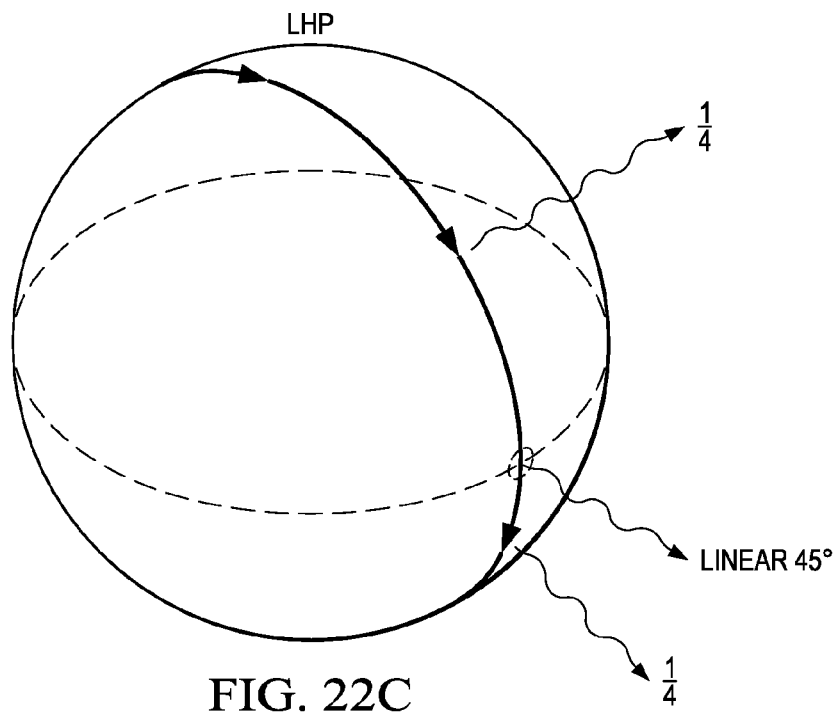
FIG. 22C illustrates a Poincare sphere.
Figure 23:
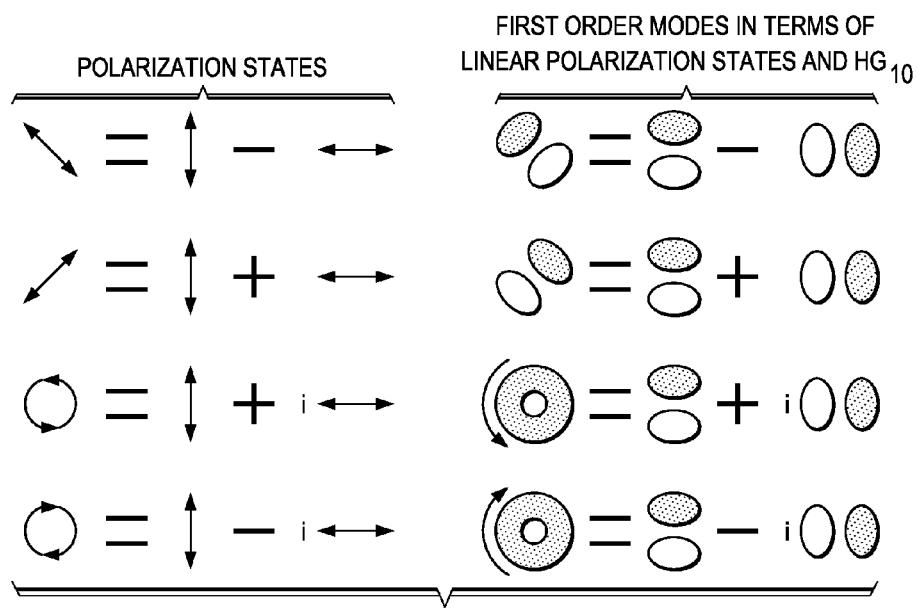
FIG. 23 illustrates a Wigner transform.
Figure 24:
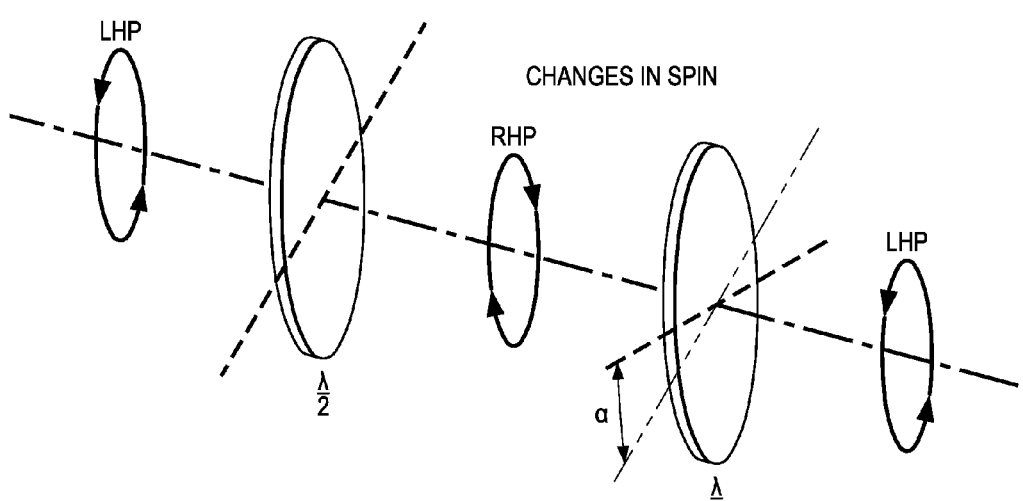
FIG. 24 illustrates changes in spin.
Figure 25:
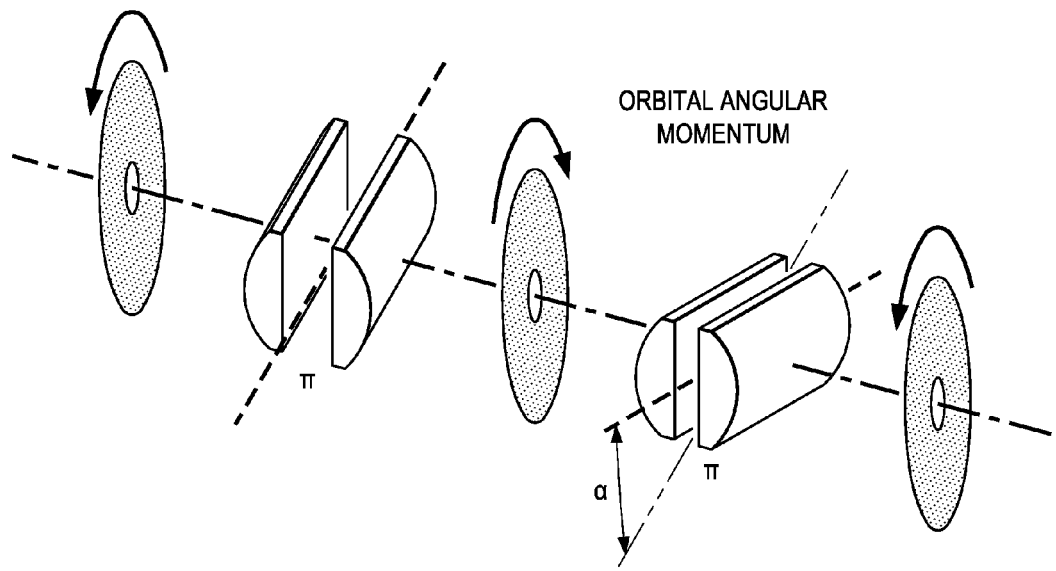
FIG. 25 illustrates change in orbital angular momentum.

As shown in FIG. 22A, $I_L$ applied to a quarter wave plate 4502 provides an output of either $I_{45}$ or $I_R$. For implementation of such a modulation technique the quarter wave plate 4502 can be used to convert intensity of left hand polarization beams to linear intensity of 45 degrees. An application of a second quarter wave plate 2204 can then convert the linear intensity at 45 degrees to an intensity of right hand polarization. Thus, a half wave plate can convert a left hand polarization intensity to a right hand polarization intensity as shown in FIG. 22B covering a trajectory from the north of the Poincare sphere to it its equator and further south of the Poincare sphere as shown in FIG. 22C. The relative phase of 2 HG modes (m=1, n=0) at 90 degrees to each other can be controlled by an arrangement of cylindrical lenses that leverage changes in relative Gouy phase to transform HG modes into LG modes and vice versa. A Wigner transform can mathematically model this transformation as shown in FIGS. 23 and 24. Changes in orbital angular momentum can similarly transform as shown in FIG. 25.

Figure 26:
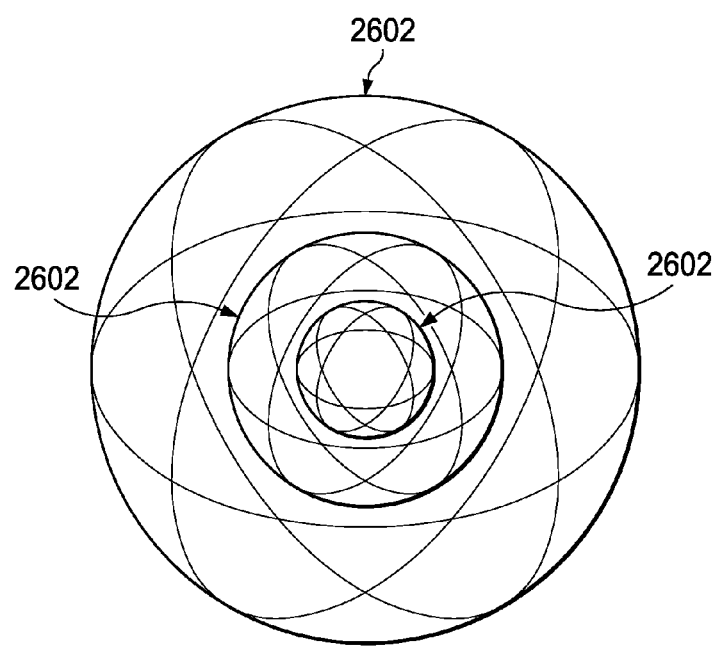
FIG. 26 illustrates concentric Poincare spheres each associated with a different orbital angular momentum.

The Poincare sphere provides a geometrical representation of polarization on the surface of the sphere. The Poincare representation is closely connected to the SU(2) structure of the transformations of the polarization states of an electromagnetic field which can describe states of orbital angular momentum (OAM) where both Laguerre-Gaussian (LG) and Hermite Gaussian (HG) can be represented on this sphere. Therefore modulation using LG and/or HG can be thought of as a trajectory on this new sphere and other concentric spheres for different orders of LG/HG as shown in FIG. 48. Thus, the states of orbital angular momentum with an underlying SU(2) structure on the same sphere for both classical and quantum fields. In analogy to the coherence matrix, we can introduce a matrix that partially describes coherent beams with orbital angular momentum. Thus, as illustrated in FIG. 26, a path for modulating using orbital angular momentum may be represented by a series of spheres 2602 that are concentric with respect to each other. The path rather than traveling over the surface of a single sphere passes between the surfaces of the multiple spheres 2602. Knowing this path signals may be modulated and then demodulated between a transmitter to a receiver in a similar manner as described herein above with respect to a path on the surface of a single sphere rather than between the surfaces of multiple spheres.

Starting from Maxwell's equations in free space, one can derive the wave equations that describe the electric field. From this wave equation, one can perform a paraxial approximation and arrived the paraxial wave equation. Maxwell's equations and the EM wave equations are represented by:

Maxwell's Equations and EM Wave Equations
Maxwell's Equations

Gauss' Laws $\quad \nabla \cdot D = \rho$
$\quad\quad\quad\quad\quad \nabla \cdot B = 0$ Faraday's Law $\quad \nabla \times E = -\frac{\partial B}{\partial t}$ Ampere's Law $\quad \nabla \times H = J + \frac{\partial D}{\partial t}$ $\nabla^2 E + k^2 E = 0$ (Full Wave Equation)

Wave Equations $$\frac{d^2E}{dx^2} + \frac{d^2E}{dy^2} + \frac{d^2E}{dz^2} + k^2E = 0 \text{ (Rectangular)}$$

$$\frac{1}{\rho}\frac{d}{d\rho}\left(\rho\frac{d}{d\rho}\right)E + \frac{1}{\rho^2}\frac{d^2}{d\varphi^2}E + \frac{d^2E}{dz^2} + k^2E = 0 \text{ (Cylindrical)}$$

The wave equations may then be converted to a paraxial wave equation in the following manner:
Paraxial Approximation
Full Wave Equations $$\frac{d^2E}{dx^2} + \frac{d^2E}{dy^2} + \frac{d^2E}{dz^2} + k^2E = 0 \text{ (Rectangular)}$$

$$\frac{1}{\rho}\frac{d}{d\rho}\left(\rho\frac{d}{d\rho}\right)E + \frac{1}{\rho^2}\frac{d^2}{d\varphi^2}E + \frac{d^2E}{dz^2} + k^2E = 0 \text{ (Cylindrical)}$$

-continued $$\frac{dE}{dz} \gg \frac{d^2E}{dz^2}$$

Paraxial Wave Equations $$\frac{d^2E}{dx^2} + \frac{d^2E}{dy^2} + \frac{2jkdE}{dz} = 0 \text{ (Rectangular)}$$

$$\frac{1}{\rho}\frac{d}{d\rho}\left(\rho\frac{d}{d\rho}\right)E + \frac{1}{\rho^2}\frac{d^2}{d\varphi^2}E + \frac{2jkdE}{dz} = 0 \text{ (Cylindrical)}$$

Finally the practical wave equation may be used to determine a Hermite Gaussian equation as follows for the rectangular solution:

Paraxial Wave Equation:

$$\frac{d^2E}{dx^2} + \frac{d^2E}{dy^2} + \frac{2jkdE}{dz} = 0$$

Solution:
Hermite-Gaussian (HG):

$$\frac{d^2E}{dx^2} + \frac{d^2E}{dy^2} + \frac{2jkdE}{dz} = 0$$

Or from the paraxial equation to a Laguerre Gaussian equation for the cylindrical solution:

Paraxial Wave Equation $$\frac{d^2E}{dx^2} + \frac{d^2E}{dy^2} + \frac{2jkdE}{dz} = 0$$

Solution:
Laguerre-Gaussian (LG)

$$E(\rho, \varphi, z) = \sum_\ell \sum_p C_{\ell p} E_0 \frac{w_0}{w(z)} \left[\frac{\sqrt{2}\rho}{w(z)}\right]^\ell$$

$$L_\ell^p \left[\frac{\sqrt{2}\rho}{w(z)}\right] e^{\frac{-\rho^2}{w^2(z)}} e^{-j(2p+\ell+1)\tan^{-1}\frac{z}{z_0}} e^{j\ell\varphi} e^{\frac{jk(\rho^2)}{2R(z)}}$$

For LG beam:

$$E = (\mathcal{E}_+ b_+ + \mathcal{E}_- b_-)fe^{-j\omega t},$$

where $f$ is the normalization factor $b_\pm$ = strength of $LG_0^{\pm\ell}$ $[b_+, b_+^+] = 1 \quad [b_-, b_-^+] = 1 \quad [b_+, b_-^+] = 0$ $$E_\pm(x, y) = \mathcal{E}_0 e^{\pm j\theta} r e^{\frac{-r^2}{w^2}}$$

For HG beam:

$$E = (\mathcal{E}_1 b_1 + \mathcal{E}_2 b_2)fe^{-j\omega t}$$

$$\mathcal{E}_\pm = \frac{\mathcal{E}_1 \pm j\mathcal{E}_2}{\sqrt{2}} \quad [b_\alpha, b_\beta^+] = \delta_{\alpha\beta}$$

$$b_1 = \frac{b_+ + b_-}{\sqrt{2}}$$

$$b_2 = \frac{j(b_+ - b_-)}{\sqrt{2}}$$

$$b_\pm = \frac{b_1 + jb_2}{\sqrt{2}}$$

SU(2) Structure:
Schwinger-Boson representation for angular momentum operators:
    conservation of photon # N
    $s^2$ constant $$s^+ = b_+ + b_- \quad s^- = b_- + b_+$$

$$s^z = \frac{1}{2}(b_+ + b_+ - b_- + b_-)$$

$$s^2 = \frac{N^2}{4} + \frac{N}{2} \quad N = (b_+ + b_+ + b_- + b_-)$$

It is possible to create commutation relations for LG beam as well as HG beams and further expand the SU(2) structure with the Schwinger-Boson representation for angular momentum operators.

Figure 10:
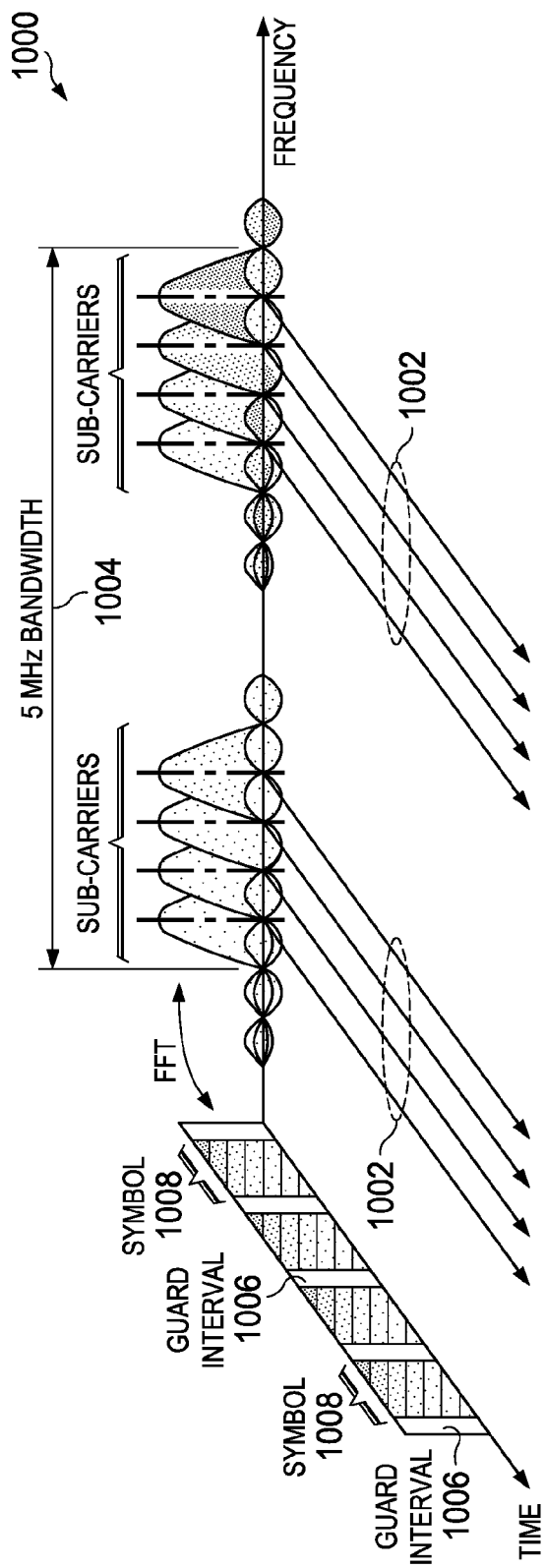
FIG. 10 illustrates a representation of an OFDM signal.

The downlink transmission scheme for E-UTRA (evolved universal terrestrial radio access), frequency division duplex (FDD) mode and time division duplex (TDD) mode is based on conventional OFDM. Referring now to FIG. 10, within an OFDM system, the available spectrum is divided into multiple carriers, called sub-carriers 1002, which are orthogonal to each other. Each of these sub-carriers 302 is independently modulated by a low rate data stream. OFDM is used as well in WLAN (Wireless Local Area Network), WiMAX (Worldwide Interoperability for Microwave Access) and broadcast technologies like DVB (Digital Video Broadcasting). OFDM has several benefits including its robustness against multipath fading and its efficient receiver architecture. FIG. 10 illustrates a representation of an OFDM signal 1000. A signal 1000 with a 4 MHz bandwidth 1004 is shown. The principle is, of course, the same for other E-UTRA bandwidths. Data symbols are independently modulated and transmitted over a high number of closely spaced orthogonal sub-carriers 1002. In E-UTRA, downlink modulation schemes such as QPSK, 16QAM and 64QAM are available. In the time domain, a guard interval 1006 may be added to each symbol 1008 to combat inter-OFDM-symbol-interference due to channel delay spread. In E-UTRA, the guard interval 1006 is a cyclic prefix which is inserted prior to the OFDM symbol 1008.

Figure 11:
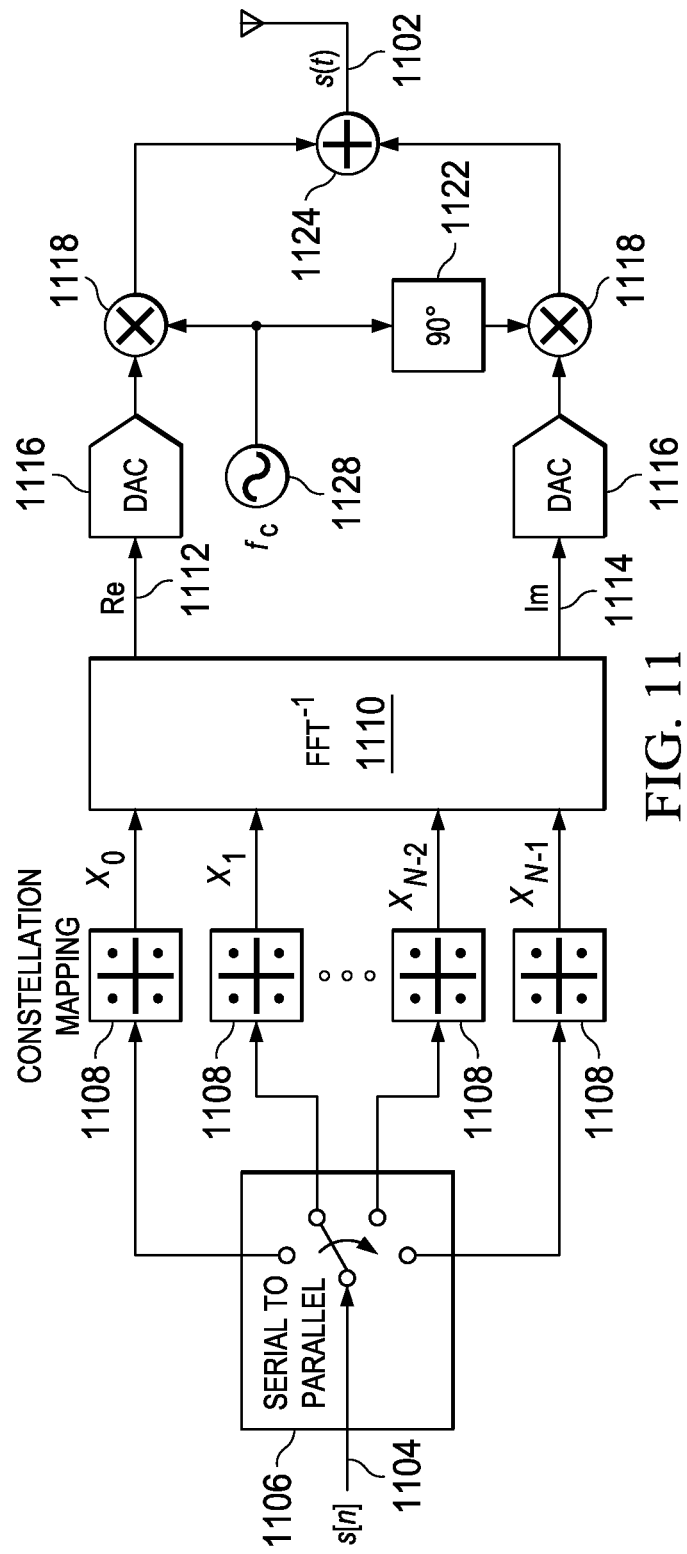
FIG. 11 illustrates an OFDM system model for generating an OFDM signal.

Referring now to FIG. 11, there is illustrated an OFDM system model for generating an OFDM signal. An OFDM carrier signal 1102 is the sum of a number of orthogonal subcarriers, with baseband data on each sub-carrier being independently modulated using some type of quadrature amplitude modulation (QAM) or phase-shift keying (PSK). This is a composite baseband signal typically used to modulate a main RF carrier. Signal s[n] 1104 is a serial stream of binary digits. A serial to parallel converter 1106 uses inverse multiplexing to demultiplex the serial stream into N parallel streams. Each of the N parallel streams are mapped to a symbol stream using a modulator 1108 applying, for example, quadrature amplitude modulation, PSK modulation, etc. The modulators 1108 may utilize different modulation schemes so that some streams may carry a higher data rate than others. The modulated data streams $x_n$ are applied to an inverse fast Fourier transform 1110. The inverse fast Fourier transform 1110 is computed for each set of symbols, giving a set of complex time-domain samples that are output as a real portion 1112 and an imaginary portion 1114. The samples are quadrature-mixed to passband in the standard manner. The real component 1112 and imaginary component 1114 are converted to analog signals via digital-to-analog converter 1116. The analog signal output from the digital-to-analog converter 1116 are modulated within a mixing circuit 1118. The analog signals are used to modulate cosine and sine waves at the carrier frequency $f_c$ 1120. The carrier signal 1120 is applied directly to the mixing circuit 1118 of the real signals and is offset by 90 degrees at 1122 before being applied to the mixing circuit 1118 of the imaginary analog signals. The mixed signals are summed at a summing circuit 1124 to give the transmission signal $s_t$ 1102.

Figure 12:
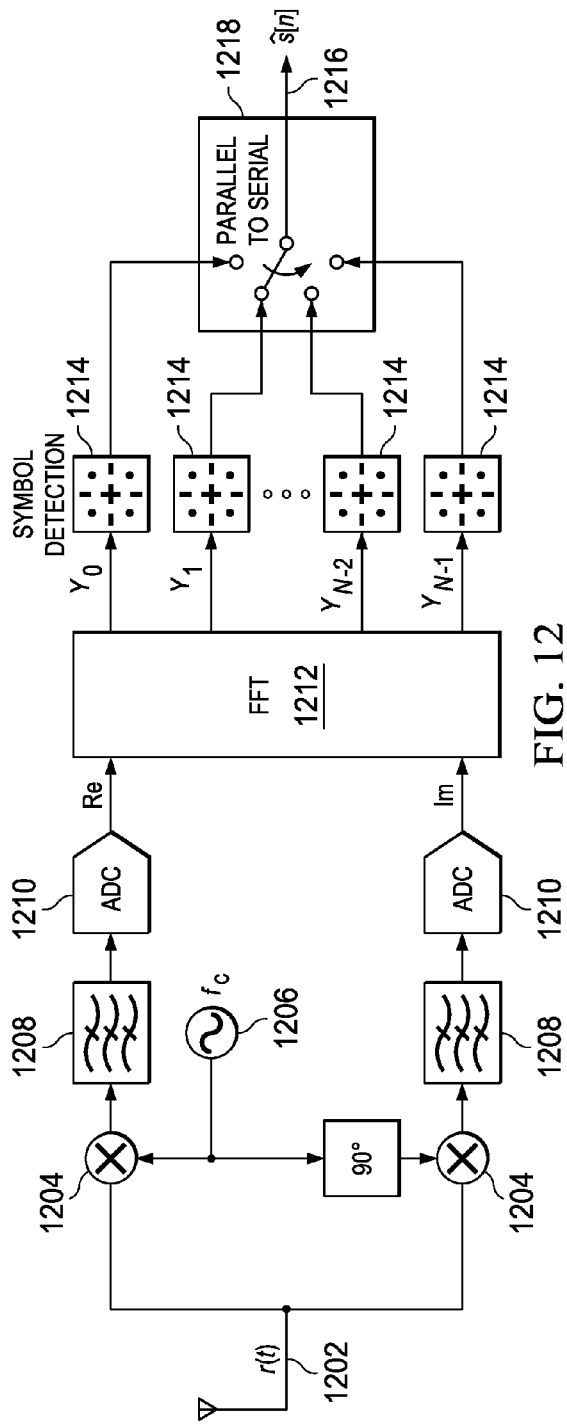
FIG. 12 illustrates a receiver circuit.

Referring now also to FIG. 12, there is illustrated the receiver circuit. The receiver picks up the received signal r(t) 1202. The received signal 1202 is quadrature-mixed down to baseband using sine and cosine waves at mixer 1204 with the carrier frequency 1206. The baseband signals are applied to samplers 1208 and the real and imaginary portions are digitized using analog-to-digital converters 1210. The digitized real and imaginary signals are applied to a fast Fourier transform 1212 to convert the signals back into the frequency domain. The frequency signals $Y_N$ are converted into a binary stream using an appropriate symbol detector 1214. The detected streams are recombined into a serial stream s[n] 1216 through a parallel-to-serial convertor 1218. The signal s[n] 1216 comprises an estimate of the original binary stream at the transmitter (FIG. 11).

Figure 13:
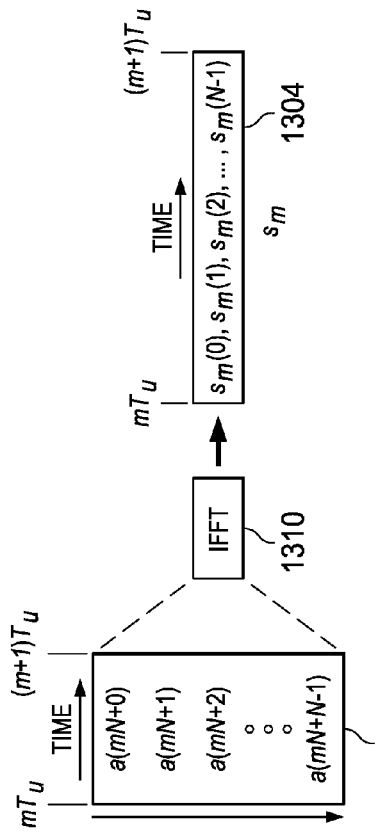
FIG. 13 illustrates the manner in which an inverse fast Fourier transform converts a plurality of modulated signals into a single signal stream.

Referring now to FIG. 13, there is illustrated the manner in which the inverse fast Fourier transform 1110 receives the plurality of modulated signals from the modulators 1108 and converts these into a single signal stream 1304.

Figure 14:
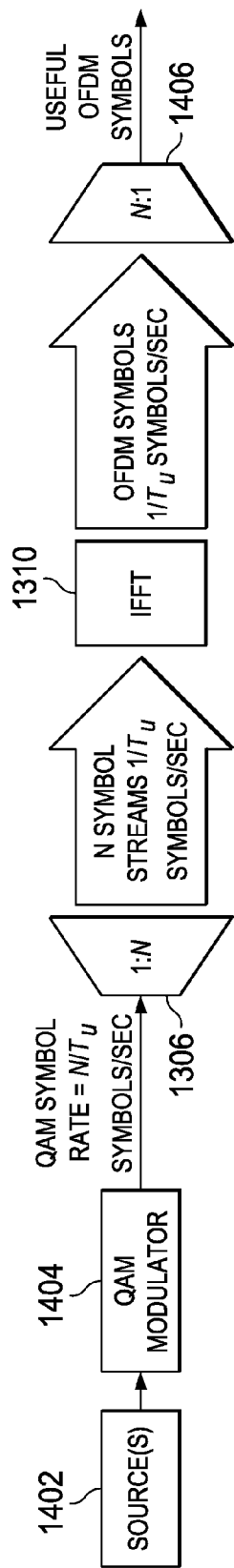
FIG. 14 illustrates the structure of OFDM carrier symbols.

FIG. 14 more generally illustrates the structure of the OFDM carrier symbols. The various data sources 1402 provide the data streams to a QAM modulator 1404 for modulation of the source signals. The QAM modulated signals are applied to the serial-to-parallel convertor 1406 that converts the serial data streams into a number of N symbol streams that are applied to the inverse fast Fourier transform 410. The generated OFDM signals are combined into a single OFDM signal stream in parallel-to-serial convertor 1406.

Figure 15:
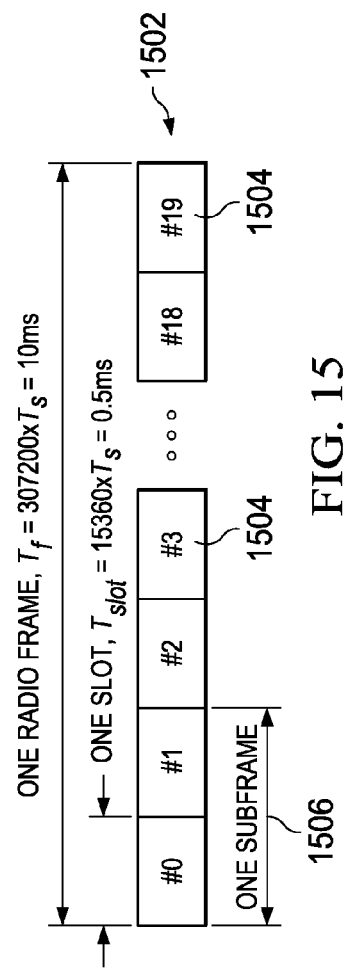
FIG. 15 illustrates a generic frame structure for E-UTRA, FDD and TDD modes.
Figure 17:
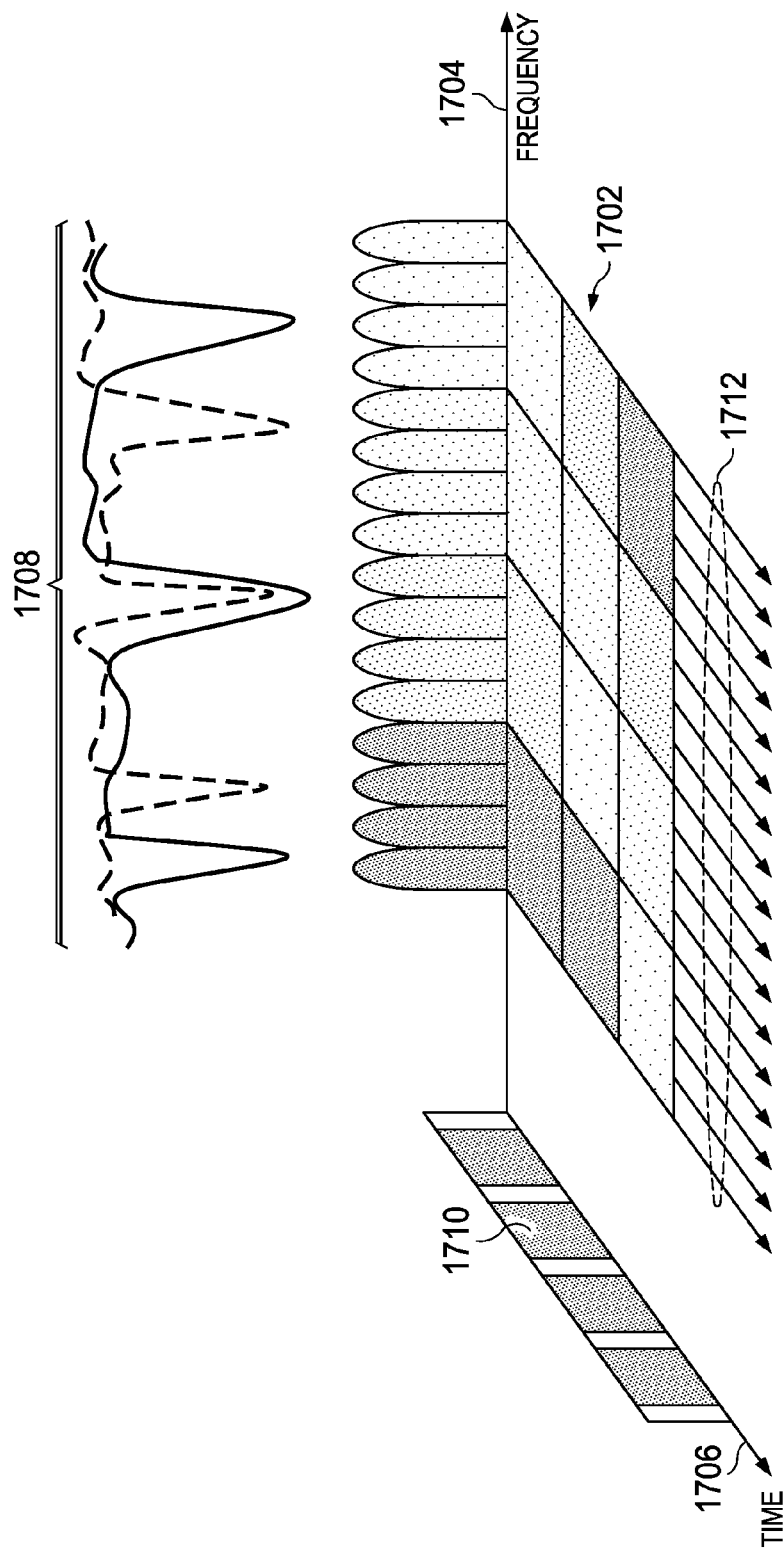
FIG. 17 illustrates a manner for assigning resource blocks to users in an OFDM system.

In contrast to an OFDM transmission scheme, OFDMA (orthogonal frequency division multiplexing access) allows the access of multiple users on the available bandwidth. Each user is assigned a specific time-frequency resource. As a fundamental principle of a E-UTRA system, the data channels are shared channels, i.e., for each transmission time interval of 1 ms, a new scheduling decision is taken regarding which users are assigned to which time/frequency resources during a transmission time interval. Referring now to FIG. 15, a generic frame structure is defined for both E-UTRA, FDD and TDD modes. Additionally, an alternative frame structure is defined for a TDD mode only. For the generic frame structure, the 10 ms radio frame 1502 is divided into 20 equally sized slots 1504 of 0.5 ms. A sub-frame 1506 consists of two consecutive slots such that one radio frame consists of 10 sub-frames. Within FIG. 15, $T_s$ is expressing the basic time unit corresponding to 30.72 MHz. OFDM radio frames contain a frame period of 10 ms, one subframe and two time slots within each time slot of period of ½ ms in the time domain. The subcarriers in the frequency domain are separated by 15 khz with 12 subcarriers creating a resource block. The frame structure can be thought of as a plane in time frequency of order of zero helicity (FIG. 17). However other planes in an orthogonal direction to time and frequency can be structured that would include positive helicity as well as negative helicity. While the mode division multiplexing modulation (MDM) using orthogonal LG and/or HG are applicable to OFDM frame, the technique is applicable to any OFDM based multiple access system (WiFi, y-max, LTE, 5G, 4G, 3G, ect.). It is possible to perform modulation based on polarization states as well as MDM states or combined states.

Figure 16:
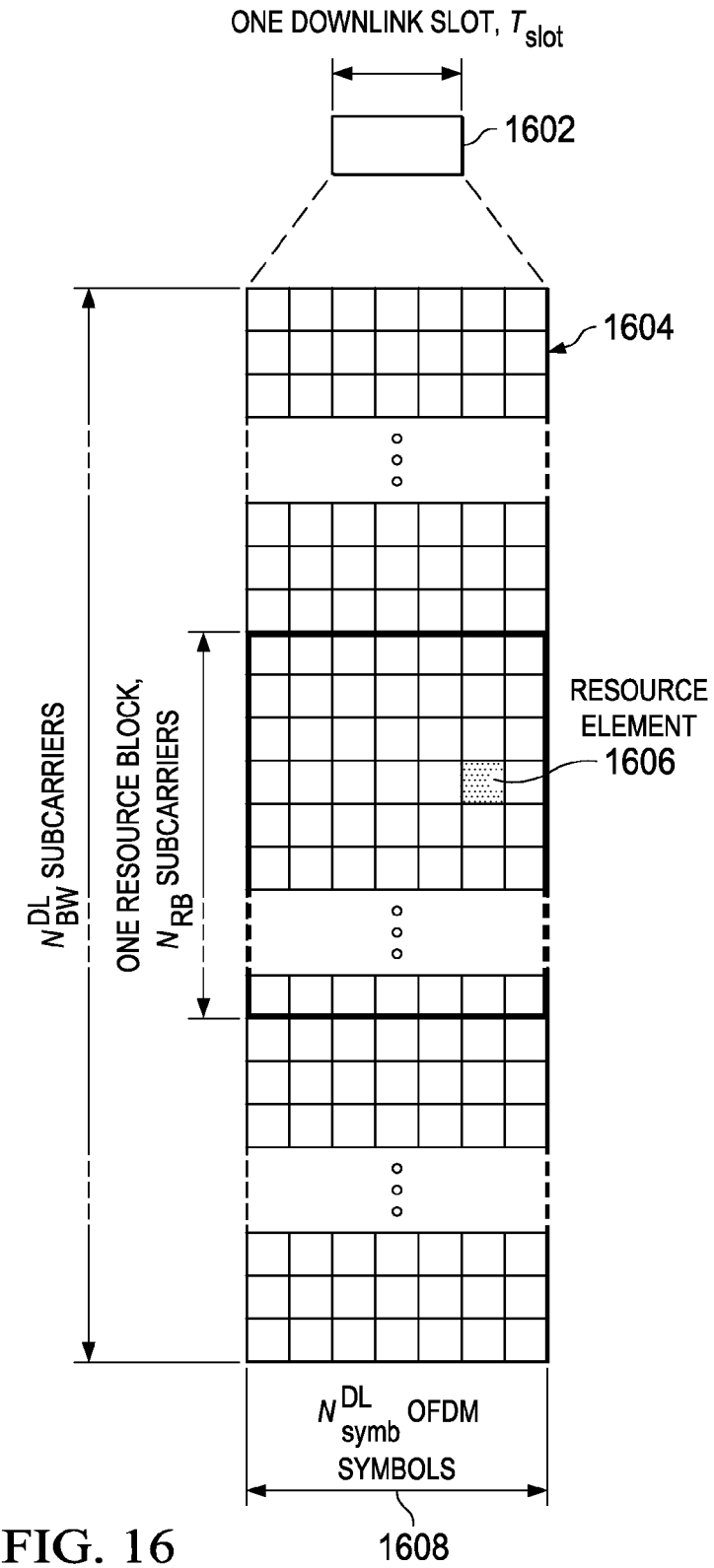
FIG. 16 illustrates a downlink resource grid structure.

Referring now to FIG. 16, there is illustrated the structure of a downlink resource grid for the duration of one downlink slot 1602. The available downlink bandwidth consists of $_{DL}N_{BW}$ sub-carriers 1604 with a spacing of f=15 kHz. In the case of multi-cell MBMS (multimedia broadcast multicast service) transmission, a subcarrier spacing of f=7.5 kHz is also possible. $_{DL}N_{BW}$ can vary in order to allow for scalable bandwidth operations up to 20 MHz. Initially, the bandwidths for LTE were explicitly defined within the layer 1 specification. Later on, a bandwidth agnostic layer 1 was introduced, with $_{DL}N_{BW}$ for the different bandwidths to be specified by 3GPP RAN4 to meet performance requirements, e.g., for out-of-band transmission requirements and regulatory emission limits. Each of the subcarriers includes a number of resource elements 1606. Each resource element 1606 is associated with their particular subcarrier 1604 and an OFDM symbol 1608.

Referring now to FIG. 17, there is provided an illustration of the manner in which a scheduler may assign various resource blocks (i.e, channels) to users within an OFDM system. The resource blocks 1702 are each designated via a frequency on the frequency axis 1704 and a time on the time axis 1706. The total number of resource blocks available to the scheduler is limited by the available frequency bandwidth 1708 and the available time slots 1710. The bandwidth 1708 can only include a limited number of sub-frequencies 1712. The scheduler algorithm controlling the scheduler block can be configured to operate in three dimensions of time, frequency and OAM states to select the best resource block for communication such that multiple time and frequency planes would be available for selection with each plane associated with a different OAM state (FIG. 18).

Figure 18:
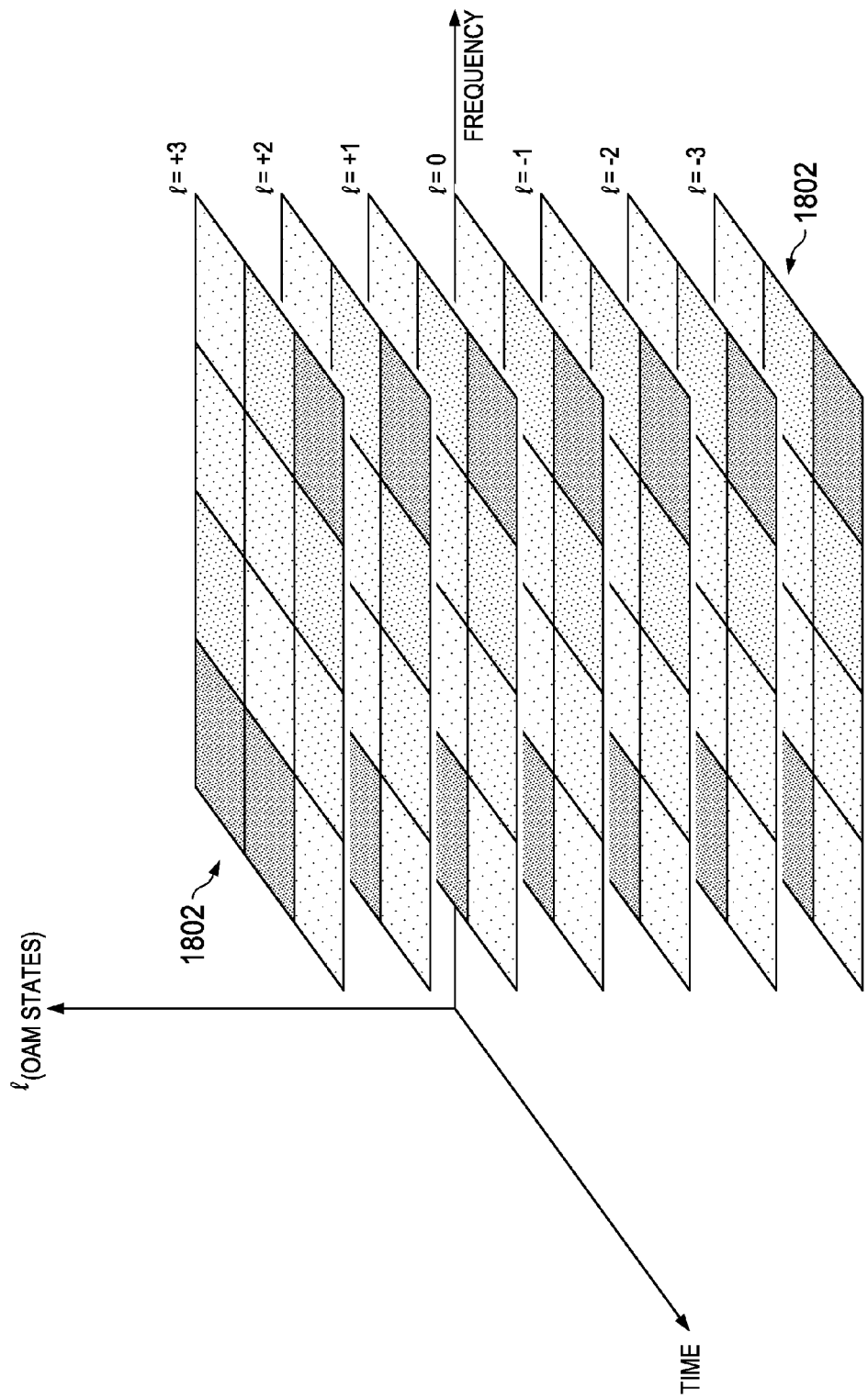
FIG. 18 illustrates the use of OAM or other orthogonal functions to increase OFDM bandwidth.

Referring now also to FIG. 18, there is illustrated the manner in which the use of orbital angular momentum or other orthogonal functions may be used to provide increased OFDM bandwidth by applying differing orbital angular momentums or other orthogonal functions to each resource grid 1802. This new multiple access technique utilizes the various OAM or other orthogonal function states as a new degree of freedom within the context of the OFDM frame structure. This technique can use six positive twisted states l=+1, +2, +3, +4, +5, +6 and six negative twisted states l=−1, −2, −3, −4, −5, −6 for a total of 12 twisted states similar to each subcarrier. These states 1804 are totally orthogonal states and therefore can be used as a new orthogonal axis within the time-frequency space. The scheduler can now use different resource block from any of these states. Thus, the frequency-time combination at l=+1 can also be used for l=+2, l=−2, l=−3 and so forth. Thus, the scheduler is algorithmically three-dimensional. This multiple access technique is referenced as OLDM (where L stand for the usual symbol l used to represent quantized orbital angular momentum states or helicity of the waves). MDM states (LG/HG) can be used for modulation (as indicated on a Poincare Sphere) and/or as a multiple access technology with a new frame structure.

Figure 19:
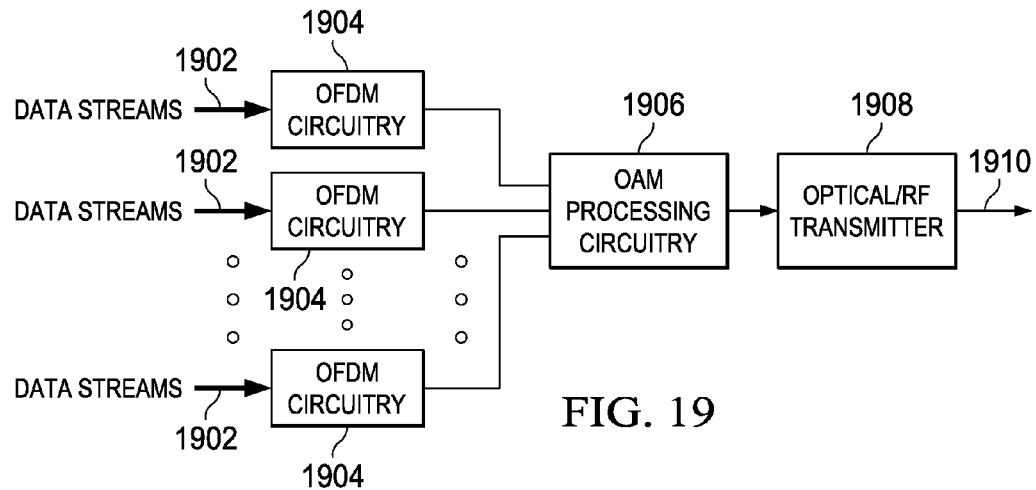
FIG. 19 illustrates a block diagram of a system for processing data streams using an OFDM format.

Referring now to FIG. 19, there is provided a generalize block diagram of the manner in which a series of data streams 1902 may be processed to provide transmission of information using the OFDM format. Various groups of data streams 1902 are provided to OFDM processing circuitries 1904. Each of the OFDM processing circuitries 1904 process the data streams 1902 to generate an OFDM output of data assigned to particular channels within the various resource blocks as illustrated in FIG. 10. Each of the outputs of the OFDM circuitry 1904 will have data assigned to a same resource block defined by a particular subcarrier and time slot. Each of the OFDM process data streams are applied to OAM (or other orthogonal) processing circuitry 1906. The OAM (or other orthogonal) processing circuitry 1906 applies a different orbital angular momentum or other orthogonal function to each of the resource grids coming from an individual OFDM circuitry 1904. Thus, it adds the third dimension of processing to the equation with each of the resource slots being represented by a frequency, time and a particular orbital angular momentum or other orthogonal function value. This OLDM processed output is provide to an optical/RF transmitter 1908 which may transmit the information over an RF or optical link 1910.

Figure 20:
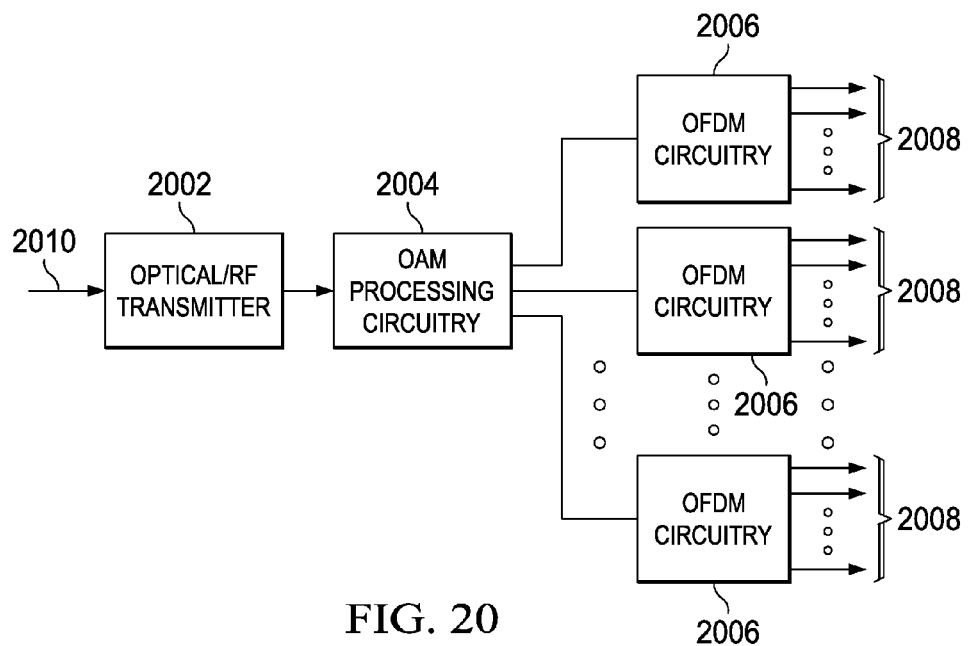
FIG. 20 illustrates a block diagram of an OFDM receiver.

Referring now to FIG. 20, a transmitted signal is received over an RF or optical link 1210 at an optical or RF receiver 2002. The OFDM signal is output by the receiver 2002 to OAM processing circuitry 2004 in order to derive the signal into each of the individual OFDM resource grids that are associated with separate orbital angular momentum or other orthogonal function values. The orbital angular momentum twist or other orthogonal function value is removed and the remaining time and frequency based signals are provided to an associated OFDM processing circuitry 2006. The OFDM processing circuitry 2006 extracts each of the individual channels associate with the various subcarriers and time slots to provide multiple output data stream 2008.

Figure 21:
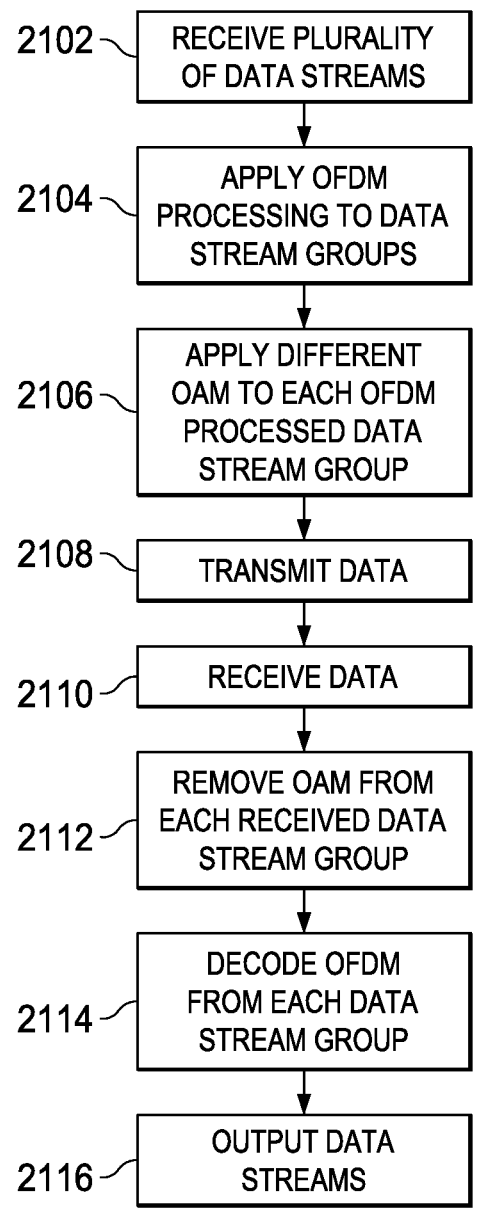
FIG. 21 illustrates a flow diagram describing the operation of the transmitter and receiver of FIGS. 19 and 20.

Referring now to FIG. 21, there is provided a flow diagram more particularly describing the operation of the transmitter and receiver of FIGS. 19 and 20. Initially, a plurality of data streams 2102 are received by the various OFDM processing circuitries 1904. The OFDM processing circuitries 1904 apply OFDM processing to each of the groups of data streams at step 2104. Each OFDM processing circuitry 1904 will apply a same OFDM processing schemes such that data is assigned to same time slots within an existing frequency/time grid structure. Next, each of the channels associated with the frequency/time-grid structures output from the OFDM circuitries 1904 are processed within the OAM or other orthogonal function processing circuitry 1906 to apply different orbital angular momentums to each of the OFDM process data stream grids at step 2106. The OLDM processed data is transmitted at step 2108 from an associated transmitter 1908. The data is received by a receiver 2002 at step 2110. The OAM processing circuitry 2004 within the receiver removes the orbital angular momentums applied to each of the received data stream groups at step 2112 and decodes each of the data stream groups using OFDM processing at step 2114. The recovered data streams are output at step 2116.

As can be seen, the available bandwidth may be greatly increased by adding the third dimension of orbital angular momentum twists to the OFDM resource grid structure. In this manner, the number of OFDM grids can be increased in the positive and negative direction by application of an associated orbital angular momentum.

It will be appreciated by those skilled in the art having the benefit of this disclosure that this new modulation and multiple access technique using orbital angular momentum provides a greater bandwidth to an OFDM processing scheme. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing multiple access communications over a communications link, comprising:
   an interface for receiving a plurality of data streams from a plurality of data sources;
   a multiplexor for grouping the plurality of data streams into a plurality of groups;
   a plurality of orthogonal frequency division multiplexing (OFDM) processing circuitries for applying a same OFDM processing to each of the plurality of groups, wherein each of the plurality of OFDM processing circuitries uses a same combination of frequency and time slot combinations on each of the plurality of groups;
   a modulator for modulating each of the OFDM processed groups onto a same signal bandwidth by applying a different, unique Hermite-Gaussian function or Laguerre-Gaussian function to each of the OFDM processed groups, each of the different unique Hermite-Gaussian functions or Laguerre-Gaussian functions defined by a respective path passing through coordinates on and between surfaces of a series of a plurality of concentric spheres, each of the spheres defining each of the different orders of Hermite-Gaussian functions or Laguerre-Gaussian functions;
   a transmitter transmitting modulated OFDM processed groups over the communications link in accordance with each of the different, unique Hermite-Gaussian functions or Laguerre-Gaussian functions;
   a receiver for receiving the modulated OFDM processed groups over the communications link;
   a demodulator for demodulating each of the received modulated OFDM processed groups in accordance with the different unique Hermite-Gaussian functions or Laguerre-Gaussian functions for each of the OFDM processed groups;
   a second multiplexor for separating the plurality of OFDM processed groups into the separate OFDM processed groups; and
   a second plurality of OFDM processing circuitries for removing the OFDM processing from each of the OFDM processed groups to provide the plurality of data streams as an output.

2. The system of claim 1, wherein the transmitter further transmits the modulated OFDM processed groups over an RF communications link.

3. The system of claim 1, wherein the transmitter further transmits the modulated OFDM processed groups over an optical communications link.

4. The system of claim 1, wherein the orthogonal frequency division multiplexing (OFDM) processing circuitry further generates a plurality of grids of channel slots, each grid of the plurality of grids defining a plurality of channel slots, each of the channel slots identified by an associated time and frequency.

5. The system of claim 4, wherein the modulator applies the different unique Hermite-Gaussian functions or Laguerre-Gaussian functions to each of the plurality of grids.

6. A method for multiple access communications over a communications link comprising:
   receiving a plurality of data streams from a plurality of data sources;
   grouping the plurality of data streams into a plurality of groups;
   applying orthogonal frequency division multiplexing (OFDM) processing to each of the plurality of groups, wherein each of the plurality of groups uses a same combination of frequency and time slot combinations in the OFDM processing;
   modulating each of the OFDM processed groups onto a same signal bandwidth by applying one of different, unique Hermite-Gaussian functions or Laguerre-Gaussian functions to each of the OFDM processed groups, each of the different unique Hermite-Gaussian functions or Laguerre-Gaussian functions defined by a respective path passing through coordinates on and between surfaces of a series of a plurality of concentric spheres, each of the spheres defining different orders of Hermite-Gaussian functions or Laguerre-Gaussian functions;
   transmitting the modulated OFDM processed groups over the communications link in accordance with each of the different, unique Hermite-Gaussian functions or Laguerre-Gaussian functions;
   receiving the modulated OFDM processed groups over the communications link;
   demodulating each of the received modulated OFDM processed groups in accordance with the different, unique Hermite-Gaussian functions or Laguerre-Gaussian functions for each of the OFDM processed groups;
   separating the plurality of OFDM processed groups into the separate OFDM processed groups; and
   removing the OFDM processing from each of the OFDM processed groups to provide the plurality of data streams as an output.

7. The method of claim 6, wherein the step of transmitting further comprises transmitting the modulated OFDM processed groups over an RF communications link.

8. The method of claim 6, wherein the step of transmitting further comprises transmitting the modulated OFDM processed groups over an optical communications link.

9. The method of claim 6, wherein the step of applying orthogonal frequency division multiplexing (OFDM) processing further comprises the step of generating a plurality of grids of channel slots, each grid of the plurality of grids defining a plurality of channel slots, each of the channel slots identified by an associated time and frequency.

10. The method of claim 9, wherein the step of modulating further comprises applying the different Hermite-Gaussian functions or Laguerre-Gaussian functions to each of the plurality of grids.

* * * * *